(12) United States Patent
Watters

(10) Patent No.: US 7,641,209 B2
(45) Date of Patent: Jan. 5, 2010

(54) VEHICLE CONVERSION ASSEMBLY AND METHOD OF CONVERTING A VEHICLE

(76) Inventor: Jeffrey Duncan Watters, 636 Park Road, Park Orchards, Victoria 3114 (AU)

( * ) Notice: Subject to any disclaimer, the term of this patent is extended or adjusted under 35 U.S.C. 154(b) by 515 days.

(21) Appl. No.: 10/822,443

(22) Filed: Apr. 12, 2004

(65) Prior Publication Data
US 2004/0256827 A1  Dec. 23, 2004

Related U.S. Application Data

(60) Provisional application No. 60/462,575, filed on Apr. 11, 2003.

(51) Int. Cl.
  *A61G 3/00* (2006.01)
  *A61G 3/02* (2006.01)
  *A61G 3/08* (2006.01)
(52) U.S. Cl. ............. 280/124.109; 280/6.152; 280/124.128; 280/124.125; 280/124.153; 296/25; 296/65.04; 414/921
(58) Field of Classification Search ........... 280/6.152, 280/124.109, 124.128, 124.125, 124.153; 296/25, 65.04; 414/921
See application file for complete search history.

(56) References Cited

U.S. PATENT DOCUMENTS

| | | | | |
|---|---|---|---|---|
| 3,905,436 A | * | 9/1975 | Karchak et al. | 180/6.5 |
| 3,941,261 A | * | 3/1976 | Ricci | 414/537 |
| 4,060,271 A | * | 11/1977 | Williams | 296/65.04 |
| 4,076,268 A | * | 2/1978 | Hart | 296/35.1 |
| 4,096,955 A | * | 6/1978 | Dake | 414/541 |
| 4,325,668 A | * | 4/1982 | Julian et al. | 414/546 |
| 4,392,684 A | * | 7/1983 | Yoshitsugu et al. | 296/203.04 |
| 4,671,730 A | * | 6/1987 | Gateau | 414/495 |
| 4,688,843 A | * | 8/1987 | Hall | 296/65.04 |
| 4,805,954 A | * | 2/1989 | Lazaroff | 296/65.04 |
| 4,807,902 A | * | 2/1989 | Girodin | 280/124.128 |
| 4,847,972 A | * | 7/1989 | Anderson et al. | 29/401.1 |
| 5,137,413 A | * | 8/1992 | Ressler | 414/474 |

(Continued)

OTHER PUBLICATIONS

Nissan Serena minivan goes front-wheel drive. Yamaguchi, Jack. Automotive Engineering Internation Online article, Global Viewpoint, Oct. 1999. Retrieved from the Internet <URL: http://web.archive.org/web/20000823160317/http://www.sae.org/automag/globalview_10-99/10.htm>.*

*Primary Examiner*—Paul N. Dickson
*Assistant Examiner*—Barry Gooden, Jr.
(74) *Attorney, Agent, or Firm*—Harness, Dickey & Pierce, P.L.C.

(57) ABSTRACT

A conversion assembly for enabling or improving wheelchair accessibility to a front-wheel-drive vehicle, wherein said assembly comprises rear suspension mountings for fixing to the structure of the vehicle in place of an existing rear suspension such that a portion of a floorpan of the vehicle of sufficient width to accommodate the width of a wheelchair can be lowered between said rear suspension mountings. A method of converting a front-wheel-drive vehicle to enable or improve wheelchair accessibility to the vehicle, the method including the steps of removing an existing rear suspension from the vehicle, installing rear suspension mountings to the vehicle, one at each side of the structure of the vehicle, and lowering a portion of the floorpan of the vehicle between said rear suspension mountings.

16 Claims, 27 Drawing Sheets

U.S. PATENT DOCUMENTS

| | | | |
|---|---|---|---|
| 5,160,236 A * | 11/1992 | Redding et al. | 414/537 |
| 5,641,176 A * | 6/1997 | Alatalo | 280/124.13 |
| 5,860,661 A * | 1/1999 | Boucher et al. | 280/124.128 |
| 5,888,038 A * | 3/1999 | Ditch et al. | 410/7 |
| 5,951,233 A * | 9/1999 | Boucher et al. | 414/495 |
| 6,071,064 A * | 6/2000 | Hackett | 414/545 |
| 6,398,251 B1 * | 6/2002 | Smith | 280/683 |
| 6,558,106 B2 * | 5/2003 | Sardonico | 414/556 |
| 7,001,132 B2 * | 2/2006 | Koretsky et al. | 414/537 |
| 2001/0048872 A1 * | 12/2001 | Sardonico | 414/556 |
| 2002/0159871 A1 * | 10/2002 | Ungetheim et al. | 414/537 |
| 2003/0094780 A1 * | 5/2003 | Cho | 280/124.128 |
| 2003/0210976 A1 * | 11/2003 | Koretsky | 414/537 |
| 2004/0094928 A1 * | 5/2004 | Amanuma | 280/124.125 |
| 2004/0256827 A1 * | 12/2004 | Watters | 280/124.1 |
| 2005/0093260 A1 * | 5/2005 | Trescott | 280/86.5 |
| 2005/0179269 A1 * | 8/2005 | Weiland | 293/149 |

* cited by examiner

VEHICLE CONVERSION ASSEMBLY AND METHOD OF CONVERTING A VEHICLE

RELATED APPLICATIONS

This application claims the benefit of the U.S. provisional application 60/462,575 filed Apr. 11, 2003 entitled "Vehicle Conversion Assembly and Method of Converting a Vehicle" which is incorporated herein in its entirety by reference.

BACKGROUND OF THE INVENTION

1. Field of the Invention

This invention relates to a conversion assembly and method for a vehicle, and more particularly, but not exclusively, to a conversion assembly and method for a front-wheel-drive vehicle for enabling or improving wheelchair accessibility to the vehicle.

2. Description of the Related Art

It has been previously proposed to modify a standard production motor vehicle to enable access to the vehicle by a person in a wheelchair. The converted vehicle must have an interior with sufficient distance between the floor and the roof to provide for headroom for the occupant of the wheelchair, and a sufficient width to accommodate the width of the wheelchair. Owing to such limitations of internal space and the necessity for a large door (usually in the form of a rear tailgate or a side sliding door), motor vehicles of the kind known as "people movers" or "vans" are popular for such conversions.

It is usually necessary to rearrange the interior of the vehicle to provide access for the wheelchair, for example by altering the standard seating arrangement of the vehicle to provide a space in the vehicle in which the wheelchair is able to be located during driving of the vehicle, and by lowering the floorpan of the vehicle in conjunction with raising the roof of the vehicle to provide sufficient headroom for an occupant of the wheelchair. The lowered portion of the floorpan provides a surface on which the wheelchair can roll from an entry means (typically in the form of a ramp or a lift) to the space in which the wheelchair is located during driving.

Conversions of this type have been performed on a motor vehicle in which the conventional suspension existing in the vehicle is of the kind having a rear beam axle configuration. In this conversion the floor is lowered in part, however as the ability to lower the floor is limited by the presence of the rear beam axle, previously proposed conversions profile the floorpan to accommodate the rear beam axle. This results in a hump or raised portion of the floorpan over the rear beam axle. As this previously proposed conversion is a rear-access conversion in which the wheelchair with occupant is loaded into the vehicle through a rear tailgate of the vehicle and is wheeled forwardly into the space in which the wheelchair is located during driving of the vehicle, the presence of the hump is problematic as it must be traversed during entry and exit to/from the vehicle. Furthermore, the presence of the hump also results in the headroom available for the wheelchair occupant being limited. In some cases, a wheelchair occupant in a converted vehicle of this kind has been known to hit his or her head on the roof of the vehicle when traversing the hump. The roof of the vehicle may be raised to improve headroom available to the occupant of the wheelchair, however this is typically undesirable for a number of reasons including that it results in the modifications to the vehicle being conspicuous.

One type of previously proposed conversion of a vehicle for enabling or improving wheelchair accessibility to the vehicle enables an occupant of a wheelchair to be seated as a passenger of the vehicle. Another type of previously proposed conversion of a vehicle enables an occupant of a wheelchair to drive the vehicle by providing a driver's seat which is movable to a position adjacent the wheelchair. The occupant of the wheelchair is able to transfer from the wheelchair to the driver's seat from where he or she is able to drive the vehicle. However, such a conversion is disadvantageous as it can be difficult, awkward, inconvenient and time-consuming for the occupant of the wheelchair to have to transfer from the wheelchair to the driver's seat to drive the vehicle and then to transfer back again to the wheelchair when he or she is to exit the vehicle.

SUMMARY OF THE INVENTION

Preferred embodiments of the present invention seek to overcome or at least alleviate one or more of the above disadvantages associated with previous conversions of vehicles for enabling or improving wheelchair accessibility.

Preferred embodiments of the present invention seek to provide a conversion assembly for a front-wheel-drive motor vehicle for enabling or improving wheelchair access to the vehicle, wherein the conversion assembly enables a portion of a floorpan of the vehicle to be lowered, the lowered portion of the floorpan being sufficiently lowered to provide sufficient interior height to accommodate a wheelchair with occupant therein, the lowered portion of the floorpan being sufficiently wide to accommodate the width of a wheelchair, and the lowered portion being substantially flat to facilitate rolling of the wheelchair along said portion of the floorpan.

In accordance with one aspect of the invention, there is provided a conversion assembly for enabling or improving wheelchair accessibility to a front-wheel-drive vehicle, wherein said assembly comprises rear suspension mountings for fixing to the structure of the vehicle in place of an existing rear suspension such that a portion of a floorpan of the vehicle of sufficient width to accommodate the width of a wheelchair can be lowered between said rear suspension mountings.

In one embodiment of the invention, the occupant of the wheelchair is a passenger of the vehicle. In one particular form of the invention, the space in which the wheelchair is to be located during driving of the vehicle is in a second row and/or a rear row of seats of the vehicle. Preferably, at least one of the standard passenger seats of the vehicle is retained next to said space, said at least one of the standard passenger seats being narrowed to accommodate the wheelchair.

In another embodiment of the invention, the vehicle is a self-drive vehicle wherein the occupant of the wheelchair is the driver of the vehicle. In this embodiment, the space in which the wheelchair is to be located during driving of the vehicle is in a second row and/or a rear row (of seats) of the vehicle, and a movable carriage is provided, the movable carriage being movable between a rear position in which the movable carriage is adjacent to said space such that the occupant can transfer between the wheelchair and the carriage and a front position in which the occupant on the carriage is in a driver's position for driving the vehicle.

Preferably, the conversion assembly is such that the lowered portion of the floorpan can extend forwardly from a rear entrance of the vehicle such that a wheelchair is able to be driven from the rear entrance to a driver's position to enable the occupant of the wheelchair to drive the vehicle from the wheelchair.

Alternatively, the conversion assembly is such that the lowered portion of the floorpan can extend forwardly from a rear entrance of the vehicle such that a wheelchair is able to be driven from the rear entrance to a front row passenger position of the vehicle where the wheelchair is restrained during driving of the vehicle to enable the occupant of the wheelchair to occupy the wheelchair in the front row passenger position during driving of the vehicle.

In accordance with another aspect of the present invention, there is provided a front-wheel-drive vehicle when converted for enabling or improving wheelchair accessibility to the vehicle using one of the above conversion assemblies.

Preferably, the lowered portion of the floorpan extends forwardly from the rear entrance of the vehicle to include the driver's position of the vehicle.

Preferably, the conversion assembly is for enabling or improving wheelchair accessibility to the vehicle from the rear of the vehicle through a doorway at the rear of the vehicle. More preferably, the conversion assembly is for enabling or improving wheelchair accessibility to the vehicle from the rear of the vehicle through a tailgate of the vehicle.

Preferably, the pair of rear suspension mountings is a pair of independent rear suspension mountings.

In embodiments in which the vehicle is provided with a chassis, the independent rear suspension mountings are preferably fixed to opposite sides of the chassis. Preferably, an additional chassis frame is fastened to an existing chassis of the vehicle, the additional chassis frame being adapted for mounting said rear suspension mountings thereon.

Typically, the existing rear suspension is in the form of a rear beam axle configuration. However, the present invention is equally applicable to vehicles having existing rear suspension of other kinds. For example, the invention is also applicable to vehicles having existing rear suspension of the kind which extends inwardly of the vehicle and inhibit the floorpan from being lowered to a width sufficient to accommodate a wheelchair.

Preferably, the lowered portion of the floorpan is at least 760 mm wide. More preferably, the lowered portion of the floorpan is at least 840 mm wide. In one preferred embodiment of the invention, the lowered portion of the floorpan is 850 mm wide. Preferably, the lowered portion of the floorpan is substantially flat. In a preferred embodiment, the lowered portion of the floorpan is substantially level.

Preferably, each of the rear suspension mountings includes an independent rear trailing arm suspension component comprising an elongated arm having a pivotal coupling at a front end thereof for enabling the elongated arm to pivot with respect to the structure of the vehicle about an axis substantially transverse to the longitudinal axis of the elongated arm, a wheel mounting for mounting a wheel of the vehicle longitudinally spaced from the axis of rotation of the elongated arm, a spring mounting for mounting a spring between the elongated arm and the structure of the vehicle, and a shock absorber mounting for mounting a shock absorber between the elongated arm and the structure of the vehicle.

Preferably, the pivotal coupling is a bearing arrangement at the front end of the elongated arm. Preferably, the shock absorber mounting is a shock absorber mounting bracket at a rear end of the elongated arm. Preferably, the spring is a coil spring or an air spring, and the spring mounting is a seating in an upper surface of the elongated arm for receiving a lower end of the coil spring or air spring. Preferably, the wheel mounting is a wheel mounting bracket mounted to an outer side of the elongated arm.

Preferably, the vehicle is provided with a restraining belt, the restraining belt being anchored to the vehicle at either side of a space in which the wheelchair is to be located during driving of the vehicle, for restraining the occupant of the wheelchair. Preferably, the belt is anchored to the vehicle on one side of the space in which the wheelchair is to be located during driving of the vehicle, by way of a belt mounting frame fixed to the structure of the vehicle.

Preferably, the vehicle is provided with locking restraints for locking the wheelchair in place during driving of the vehicle.

In accordance with another aspect of the present invention, there is provided a method of converting a front-wheel-drive vehicle to enable or improve wheelchair accessibility to the vehicle, the method including the steps of:
removing an existing rear suspension from the vehicle;
installing rear suspension mountings to the vehicle, one at each side of the structure of the vehicle; and
lowering a portion of the floorpan of the vehicle between said rear suspension mountings.

Preferably, the lowered portion of the floorpan extends forwardly from a rear entrance of the vehicle such that a wheelchair is able to be driven from the rear entrance to a driver's position where the wheelchair is restrained during driving of the vehicle to enable the occupant of the wheelchair to drive the vehicle from the wheelchair.

Alternatively, the lowered portion of the floorpan extends forwardly from a rear entrance of the vehicle such that a wheelchair is able to be driven from the rear entrance to a front row passenger position of the vehicle where the wheelchair is restrained during driving of the vehicle to enable the occupant of the wheelchair to occupy the wheelchair in the front row passenger position during driving of the vehicle.

Preferably, the method includes the step of lowering the portion of the floorpan of the vehicle between said rear suspension mountings such that the lowered portion of the floorpan extends forwardly from the rear entrance of the vehicle to include the driver's position of the vehicle.

Preferably, the rear suspension mountings are independent rear suspension mountings.

Preferably, the method further includes the step of attaching an additional chassis frame to an existing chassis of the vehicle, the additional chassis frame being adapted for mounting said independent rear suspension mountings thereon.

Preferably, the step of lowering the portion of the floorpan of the vehicle includes lowering the portion of the floorpan such that the lowered portion of the floorpan is at least 760 mm wide. In one preferred embodiment, the step of lowering the portion of the floorpan of the vehicle includes lowering the portion of the floorpan such that the lowered portion of the floorpan is at least 840 mm wide. In one particular embodiment, the step of lowering the portion of the floorpan of the vehicle includes lowering the portion of the floorpan such that the lowered portion of the floorpan is 850 mm wide. Preferably, the step of lowering the portion of the floorpan of the vehicle includes lowering the portion of the floorpan such that the lowered portion of the floorpan is substantially flat. In a preferred embodiment, the step of lowering the portion of the floorpan of the vehicle includes lowering the portion of the floorpan such that the lowered portion of the floorpan is substantially level.

Preferably, the method further includes the step of installing a restraining belt, the restraining belt being anchored to the vehicle at either side of a space in which the wheelchair is to be located during driving of the vehicle, for restraining the occupant of the wheelchair. Preferably, the method further includes the step of fixing a belt mounting frame to the structure of the vehicle on one side of said space, the belt mounting frame being for mounting the restraining belt.

In accordance with another aspect of the present invention, there is provided a front-wheel-drive vehicle when converted for enabling or improving wheelchair accessibility to the vehicle using the method described above.

In accordance with yet another aspect of the present invention, there is provided a front-wheel-drive vehicle converted to enable or improve wheelchair accessibility to the vehicle, wherein said vehicle includes rear suspension mountings fixed to the structure of the vehicle, a portion of a floorpan of the vehicle of sufficient width to accommodate the width of a wheelchair, said portion being located between said rear suspension mountings and extending forwardly from a rear entrance of the vehicle such that a wheelchair is able to be driven from the rear entrance to a driver's position where the wheelchair is restrained during driving of the vehicle to enable the occupant of the wheelchair to drive the vehicle from the wheelchair.

In accordance with still another aspect of the present invention, there is provided a front-wheel-drive vehicle converted to enable or improve wheelchair accessibility to the vehicle, wherein said vehicle includes rear suspension mountings fixed to the structure of the vehicle, a portion of a floorpan of the vehicle of sufficient width to accommodate the width of a wheelchair, said portion being located between said rear suspension mountings and extending forwardly from a rear entrance of the vehicle such that a wheelchair is able to be driven from the rear entrance to a front row passenger position where the wheelchair is restrained during driving of the vehicle to enable the occupant of the wheelchair to occupy the wheelchair in the front row passenger position during driving of the vehicle.

In accordance with another aspect of the invention, there is provided an independent rear trailing arm suspension component for a front-wheel-drive vehicle requiring wheelchair access comprising an elongated arm having a pivotal coupling at a front end thereof for enabling the elongated arm to pivot with respect to a structure of the vehicle about an axis substantially transverse to the longitudinal axis of the elongated arm, a wheel mounting for mounting a wheel of the vehicle longitudinally spaced from the axis of rotation of the elongated arm, a spring mounting for mounting a spring between the elongated arm and the structure of the vehicle, and a shock absorber mounting for mounting a shock absorber between the elongated arm and the structure of the vehicle.

BRIEF DESCRIPTION OF THE DRAWINGS

The invention is described, by way of non-limiting example only, with reference to the accompanying drawings in which:

FIG. 10b is a seating diagram of a vehicle using the floorpan shown in FIGS. 7 to 10a;

DETAILED DESCRIPTION OF THE PREFERRED EMBODIMENT

Figure 1:
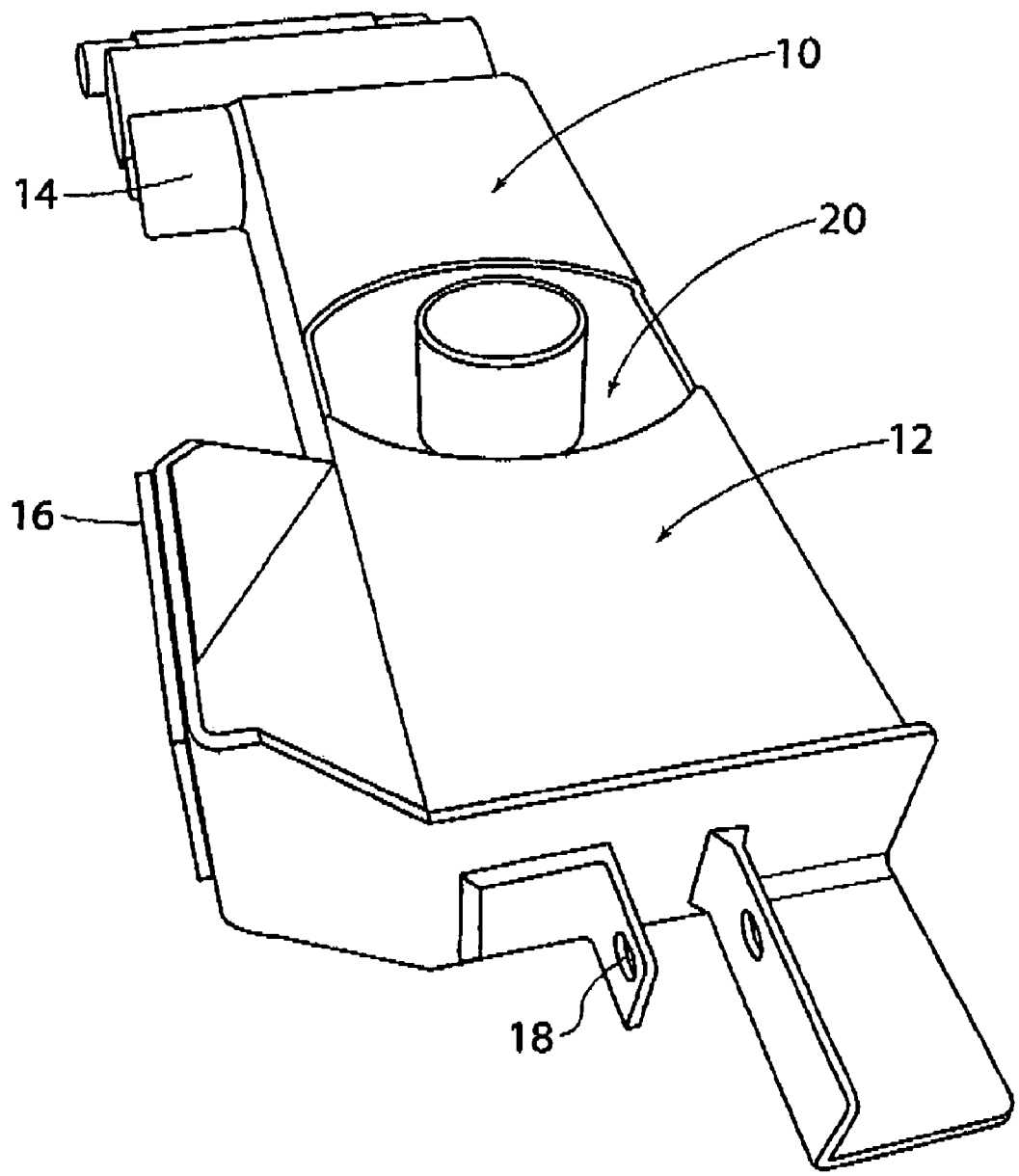
FIG. 1 is a top perspective view of an independent rear trailing arm suspension component.
Figure 2:
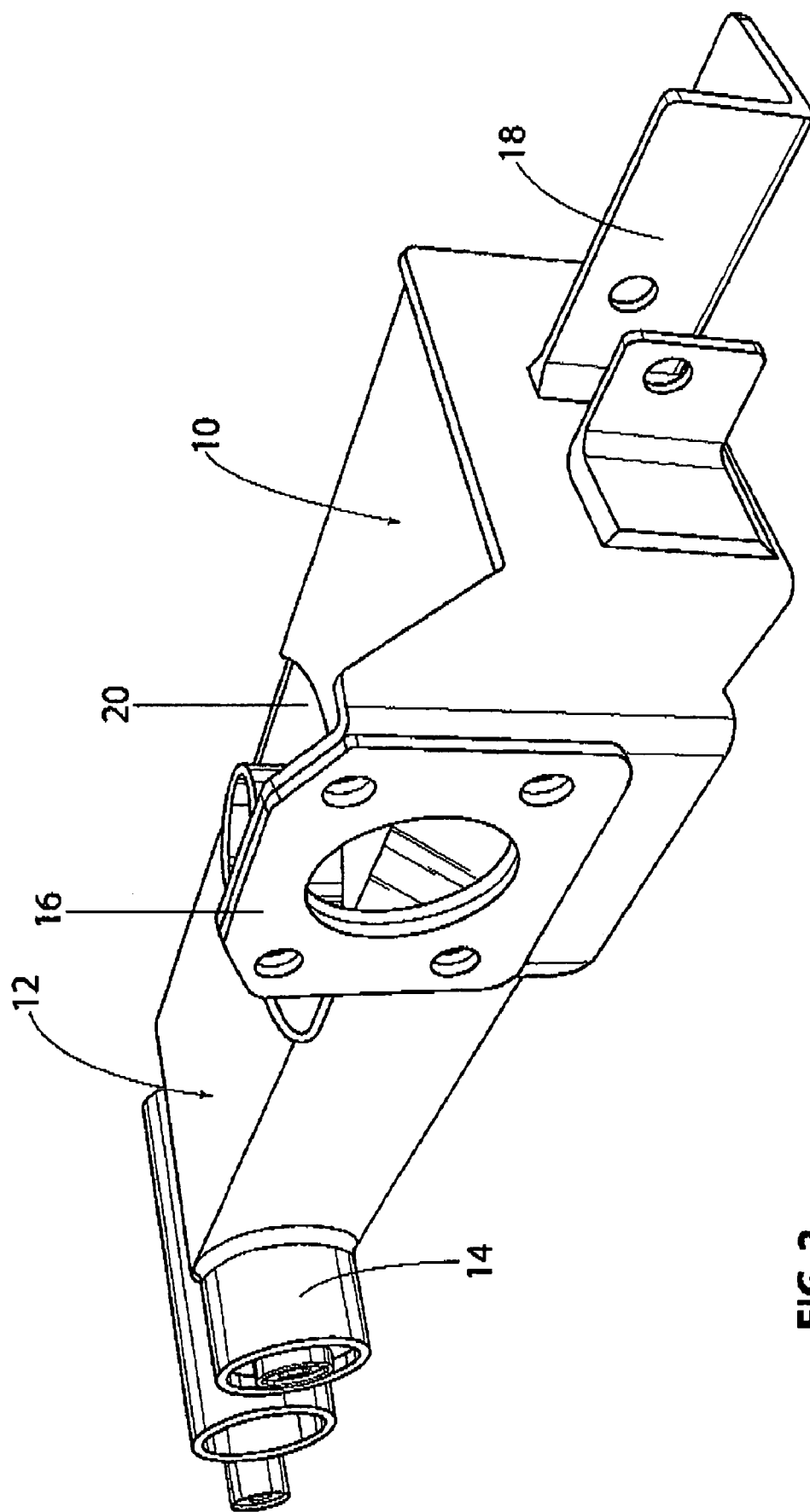
FIG. 2 is a side perspective view of the independent rear trailing arm suspension component of FIG. 1.
Figure 3:
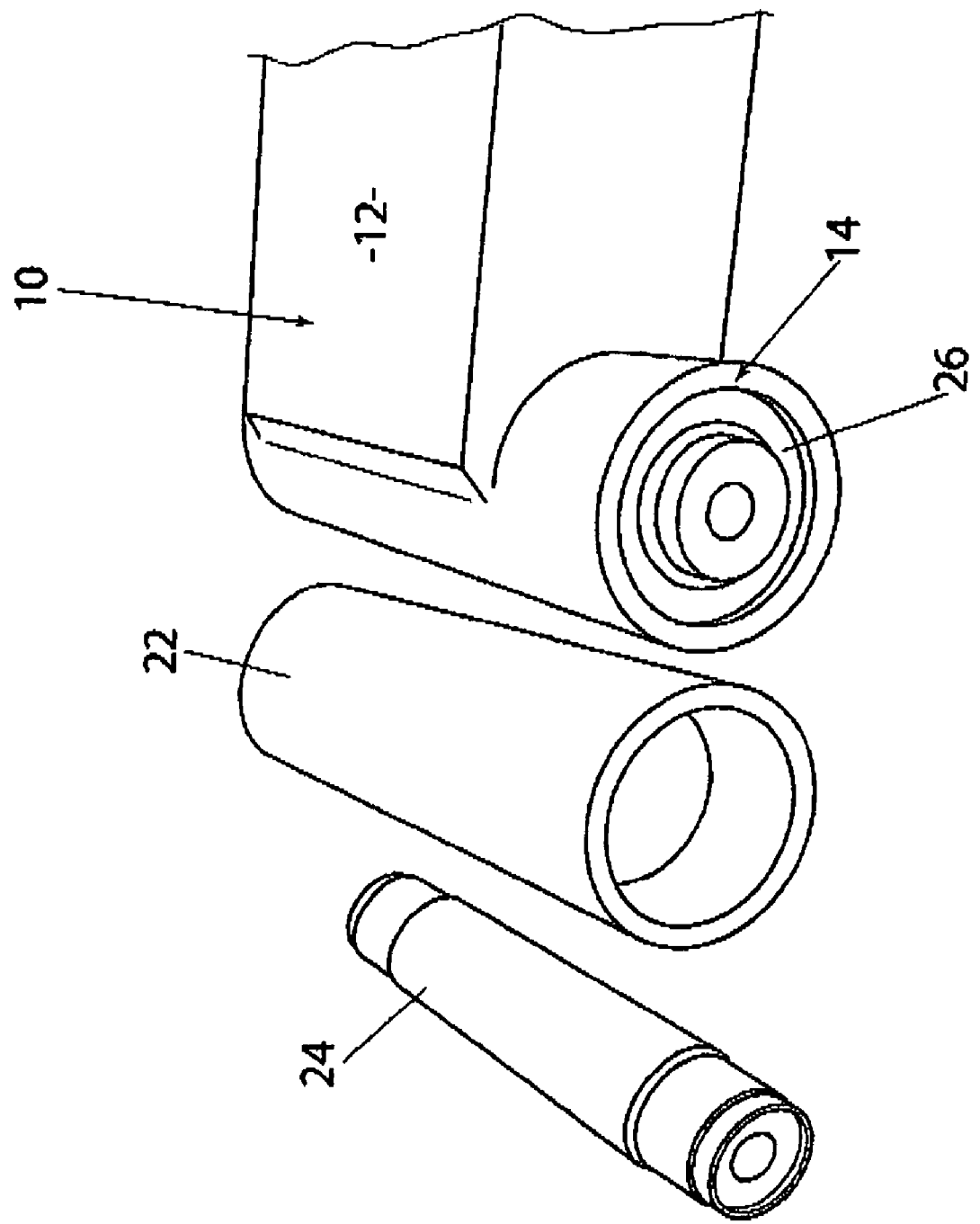
FIG. 3 is a detailed side perspective view of a front portion of the independent rear trailing arm suspension component of FIG. 1, also showing separate elements used in the manufacture of the independent rear trailing arm suspension component.

A left-hand independent rear trailing arm suspension component 10 is shown in FIGS. 1 to 3, and comprises an elongated arm 12 having a pivotal chassis coupling in the form of a bearing arrangement 14 at a front end thereof. The rear trailing arm suspension component 10 also comprises a wheel mounting bracket 16 mounted to an outer side of the elongated arm 12, and longitudinally spaced from the bearing arrangement 14. A shock absorber mounting bracket 18 is mounted at a rear end of the elongated arm 12. Intermediate the bearing arrangement 14 and the shock absorber mounting bracket 18, a spring mounting in the form of a coil spring seating 20 is formed in an upper surface of the elongated arm 12. The independent rear trailing arm suspension component 10 shown in the accompanying drawings is manufactured by welding and machining processes. The independent rear trailing arm suspension component 10 is reinforced internally of its outer surfaces by additional struts and ties (not shown) to ensure that the component 10 is able to withstand forces, such as torsional and axial forces, to which it may be subjected during its working life.

FIG. 3 shows detail of bearing arrangement 14 at the front end of the independent rear trailing arm suspension component 10, together with separated elements 22,24 from which the independent rear trailing arm suspension component 10 is manufactured. In particular, FIG. 3 shows a housing 22 of the bearing arrangement 14, and an inner core shaft 24 of the bearing arrangement 14. As can be seen from the side view of the formed bearing arrangement 14 in this Figure, bearings 26 are inserted between the inner core shaft 24 and the housing 22 to enable rotation of the inner core shaft 24 within the housing 22. In use, independent rear trailing arm suspension component 10 is mounted to a vehicle requiring wheelchair access by bolting the inner core shaft 24 at either end thereof to a chassis 38 of the vehicle (and more particularly to an additional chassis frame 38a of the vehicle), as can be seen in FIGS. 4 to 6.

Figure 4:
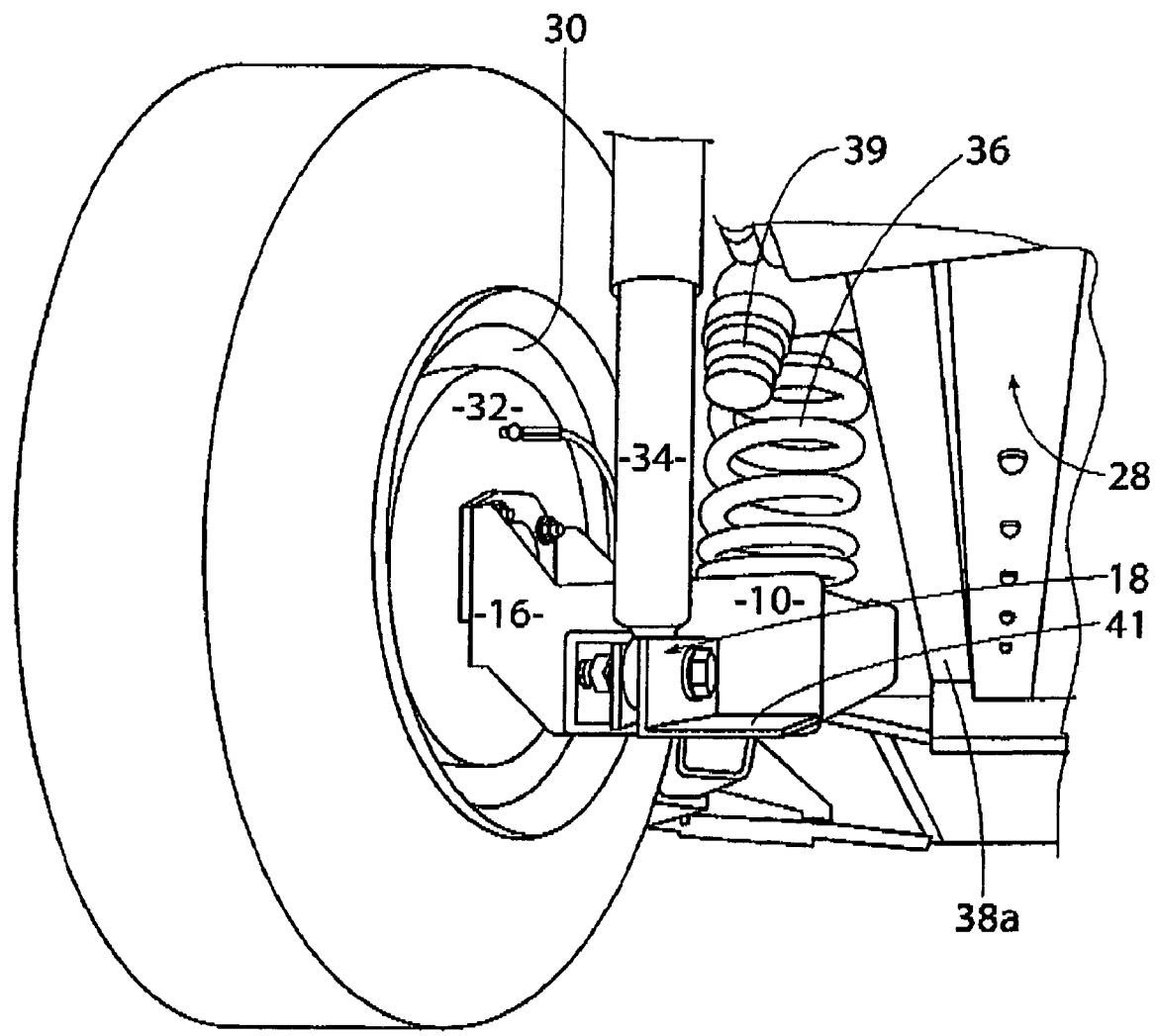
FIG. 4 is a rear perspective view of a left-hand independent rear trailing arm suspension component similar to that shown in FIG. 1, the left-hand independent rear trailing arm suspension component being fitted to a vehicle.

FIG. 4 shows the left-hand independent rear trailing arm suspension component 10 mounted to a motor vehicle requiring wheelchair access. A left-hand rear wheel 30 is mounted to the wheel mounting bracket 16 by way of a drum brake 32 of the left-hand rear wheel 30 being bolted to the wheel mounting bracket 16. An original standard shock absorber 34 and original standard coil spring 36 from the original rear beam axle configuration of the standard production vehicle as it existed prior to being modified for wheelchair access are retained in the conversion. A lower end of the shock absorber 34 is bolted to the shock absorber mounting bracket 18, and the coil spring 36 is mounted between the independent rear trailing arm suspension component 10 and the structure of the vehicle such that a lower end of the coil spring 36 sits in the seating 20 formed in the upper surface of the elongated arm 12 of the independent rear trailing arm suspension component 10. The suspension operates by the independent rear trailing arm suspension component 10 being able to pivot about the inner core shaft 24 which forms an axis, substantially transverse to the longitudinal axis of the elongated arm 12, for such pivotal movement. The coil spring 36 operates resiliently to oppose upward movement of the independent rear trailing arm suspension component 10 toward the chassis 38 of the vehicle 28, and the shock absorber 34 acts to dampen pivotal movement of the independent rear trailing arm suspension component 10 with respect to the chassis 38 of the vehicle 28. A deformable stopper 39 is provided, mounted on the additional chassis frame 38a, to inhibit excessive upward movement of the independent rear trailing arm suspension component 10 with respect to the chassis 38 by bearing against a rear plate 41 of the independent rear trailing arm suspension component 10. The standard braking system from the original standard production vehicle is retained in the conversion.

In alternative embodiments, other forms of spring may be used in place of the coil spring 36. In one particular alternative embodiment (not shown), an air spring is used in place of the coil spring 36.

Figure 5:
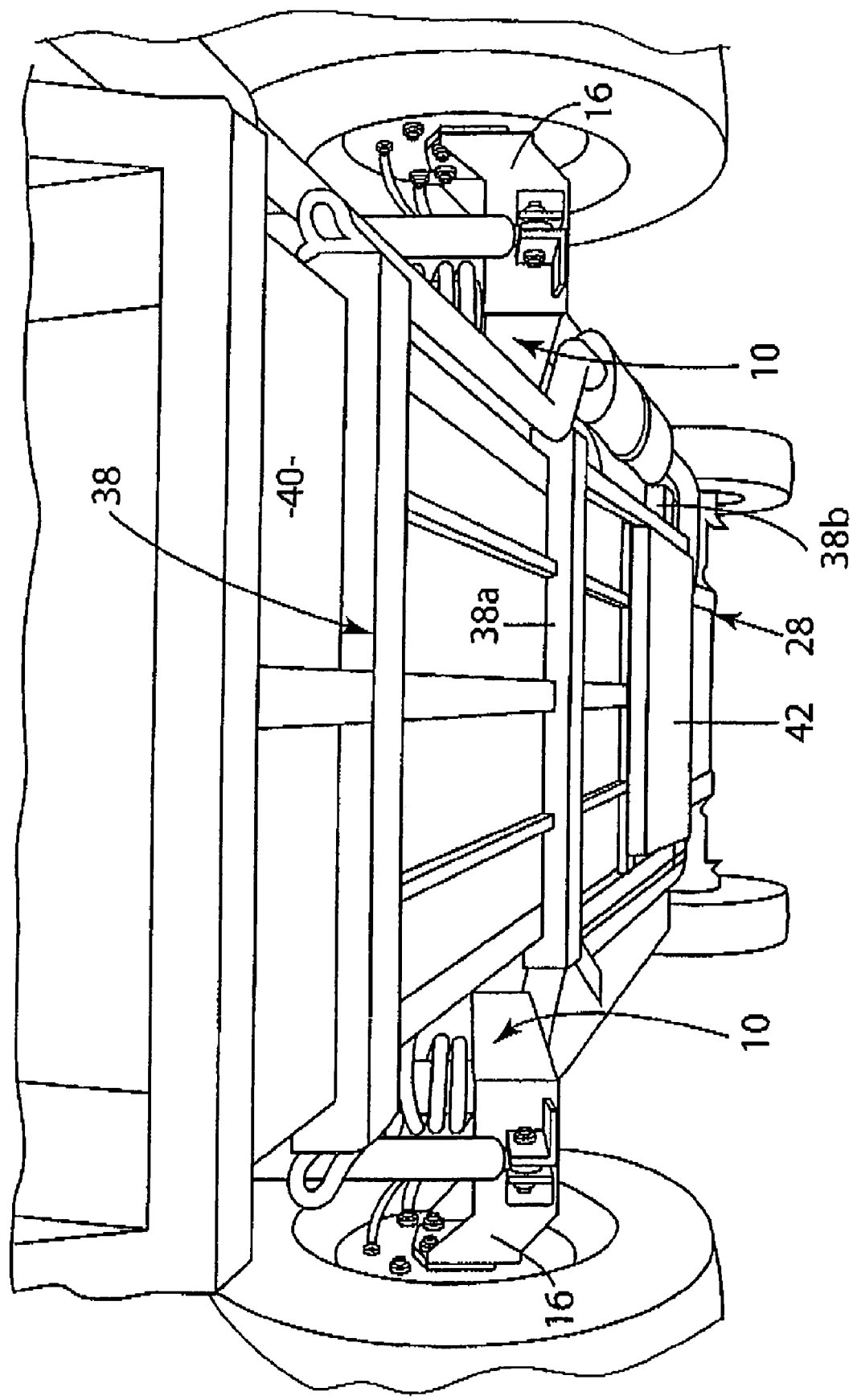
FIG. 5 is a rear view of the undercarriage of the vehicle shown in FIG. 4, showing both left-hand and right-hand independent rear trailing arm suspension components fitted to the vehicle.
Figure 6:
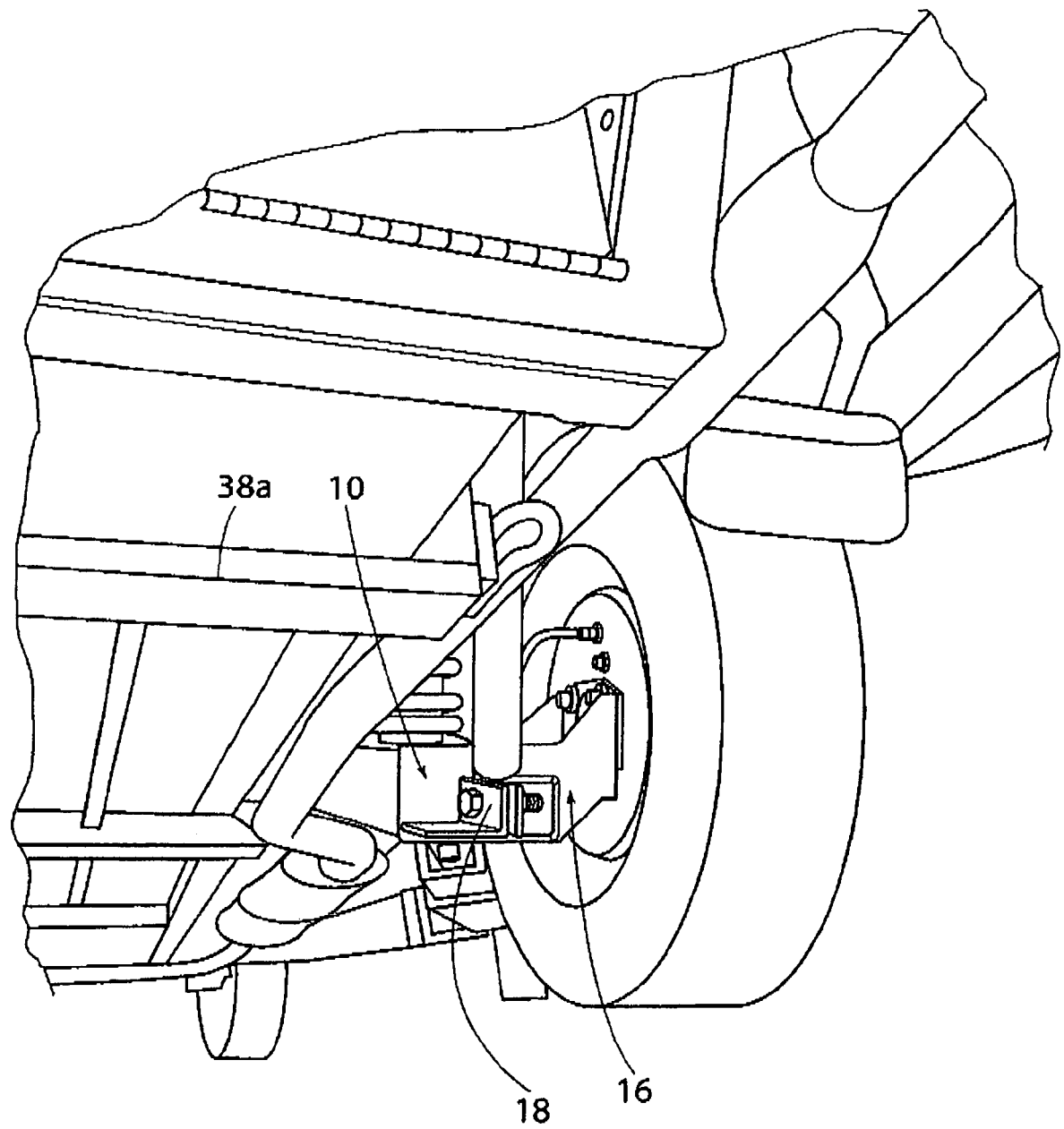
FIG. 6 is a rear perspective view of the right-hand independent rear trailing arm suspension component shown in FIG. 5.
Figure 7:
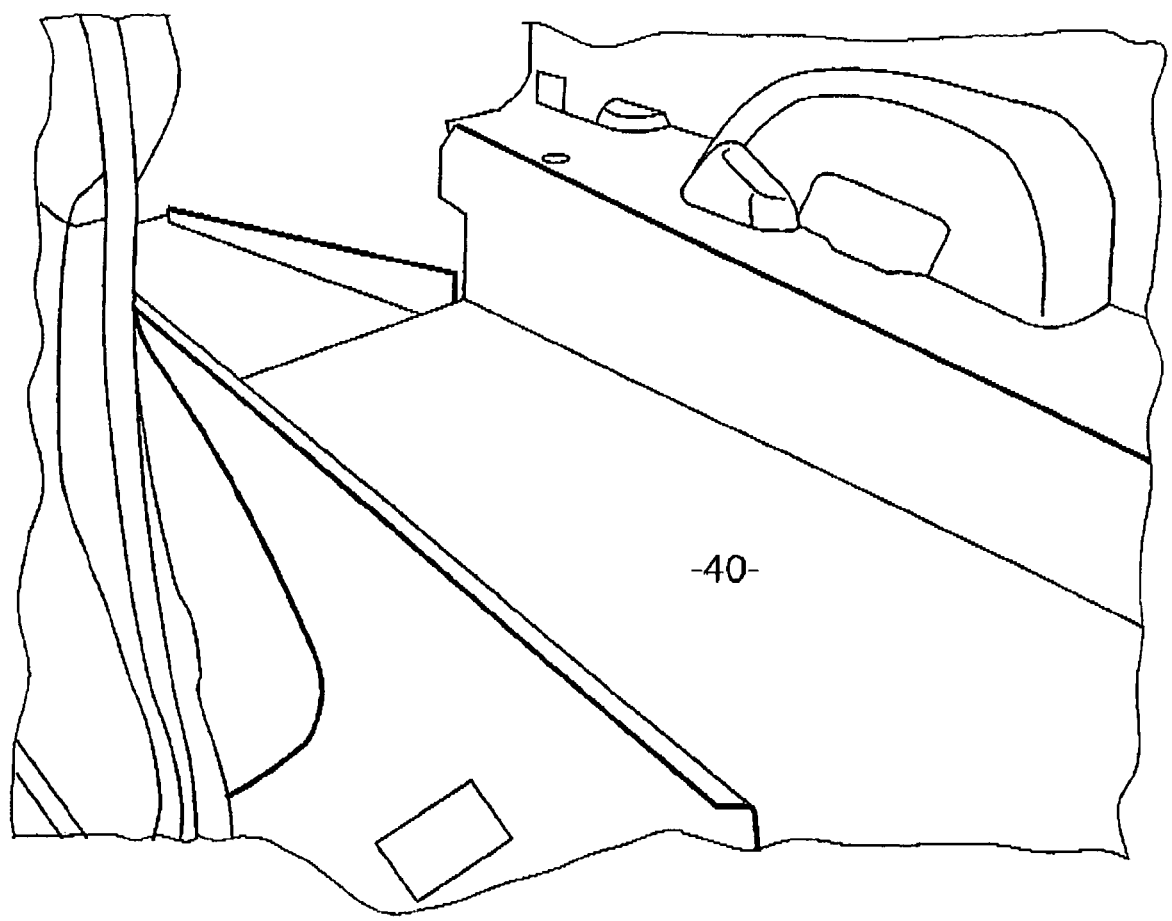
FIG. 7 is a top perspective view of a rear portion of a lowered floorpan of a vehicle partially converted for self-drive rear-entry wheelchair access.
Figure 8:
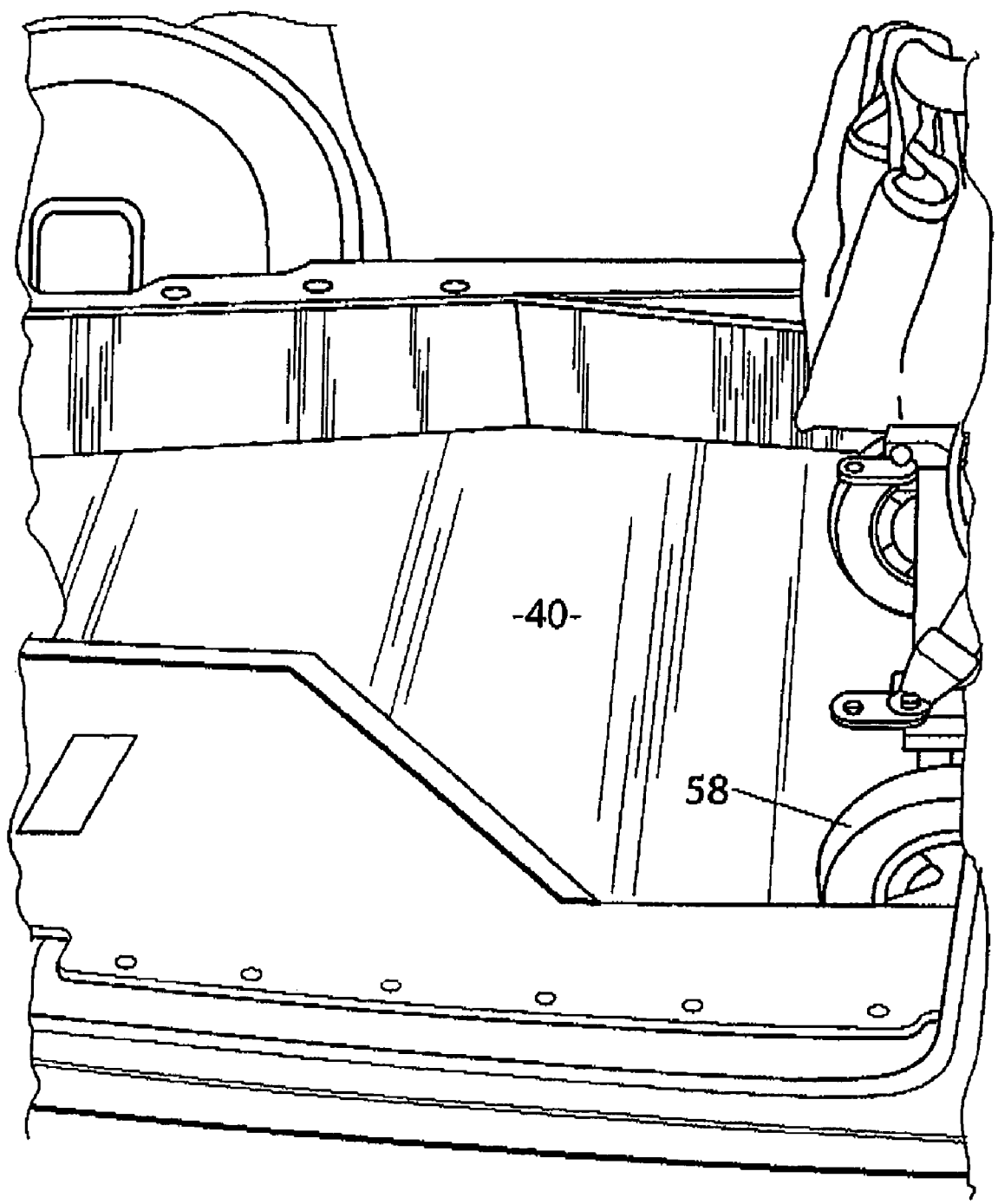
FIG. 8 is a right side perspective view of a centre portion of the lowered floorpan shown in FIG. 7.
Figure 9:
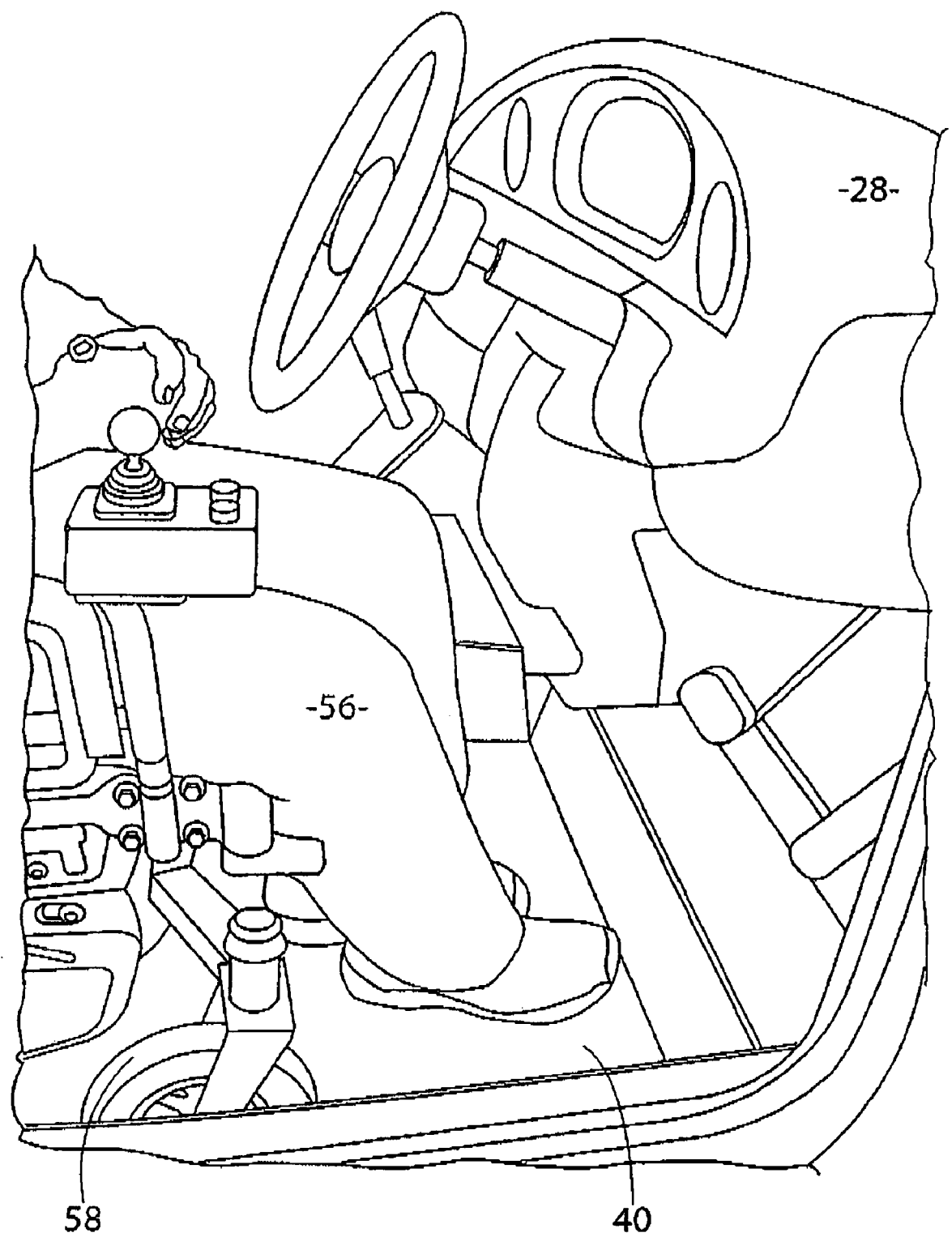
FIG. 9 is a right side perspective view of a front portion of the lowered floorpan shown in FIG. 7.
Figure 16:
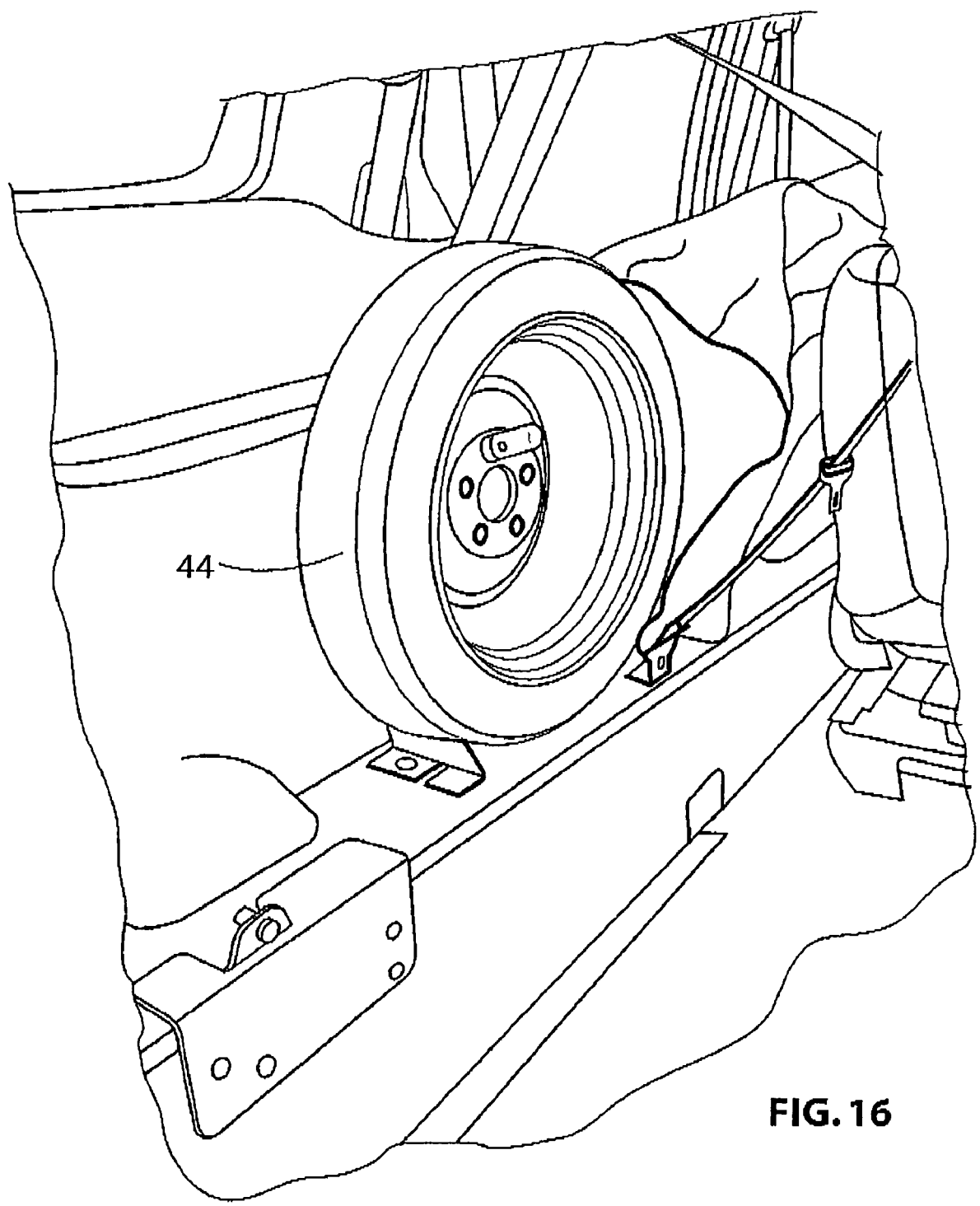
FIG. 16 is a rear perspective view of a spare wheel of the vehicle shown in FIGS. 12 to 15, the spare wheel being a "space-saving" spare wheel mounted to one side of the lowered portion of the floorpan.

As can be seen in FIG. 5, the rear beam axle configuration rear suspension which was present in the original standard production vehicle prior to conversion for wheel chair access has been removed, and in its place independent rear trailing arm suspension components 10 have been mounted to either side of the chassis 38 of the vehicle 28. A portion of the floorpan 40 between the independent rear trailing arm suspension components 10 has been lowered to facilitate the wheelchair access to the cabin of the vehicle 28. To enable this portion of the floorpan 40 to be lowered, an additional chassis frame 38a is fastened to an existing chassis 38b of the vehicle by conventional chassis-forming techniques such as welding, fastening with bolts and/or adhesives. The relative narrowness of the independent rear trailing arm suspension components 10 enables the floorpan to be lowered by approximately 0.45 m from its original height, and in a sufficient width to accommodate the width of a wheelchair. The floorpan is lowered by cutting out the original floorpan with angle grinders or the like and by installing the replacement lowered floorpan on the additional chassis frame 38a. Owing to the lowering of the floorpan taking up space which was previously used for a fuel tank and a spare wheel, a replacement fuel tank 42 is installed toward the front of the vehicle 28 and a "space-saver" spare wheel 44 is installed inside the cabin of the vehicle 28, as shown in FIG. 16.

Figure 25:
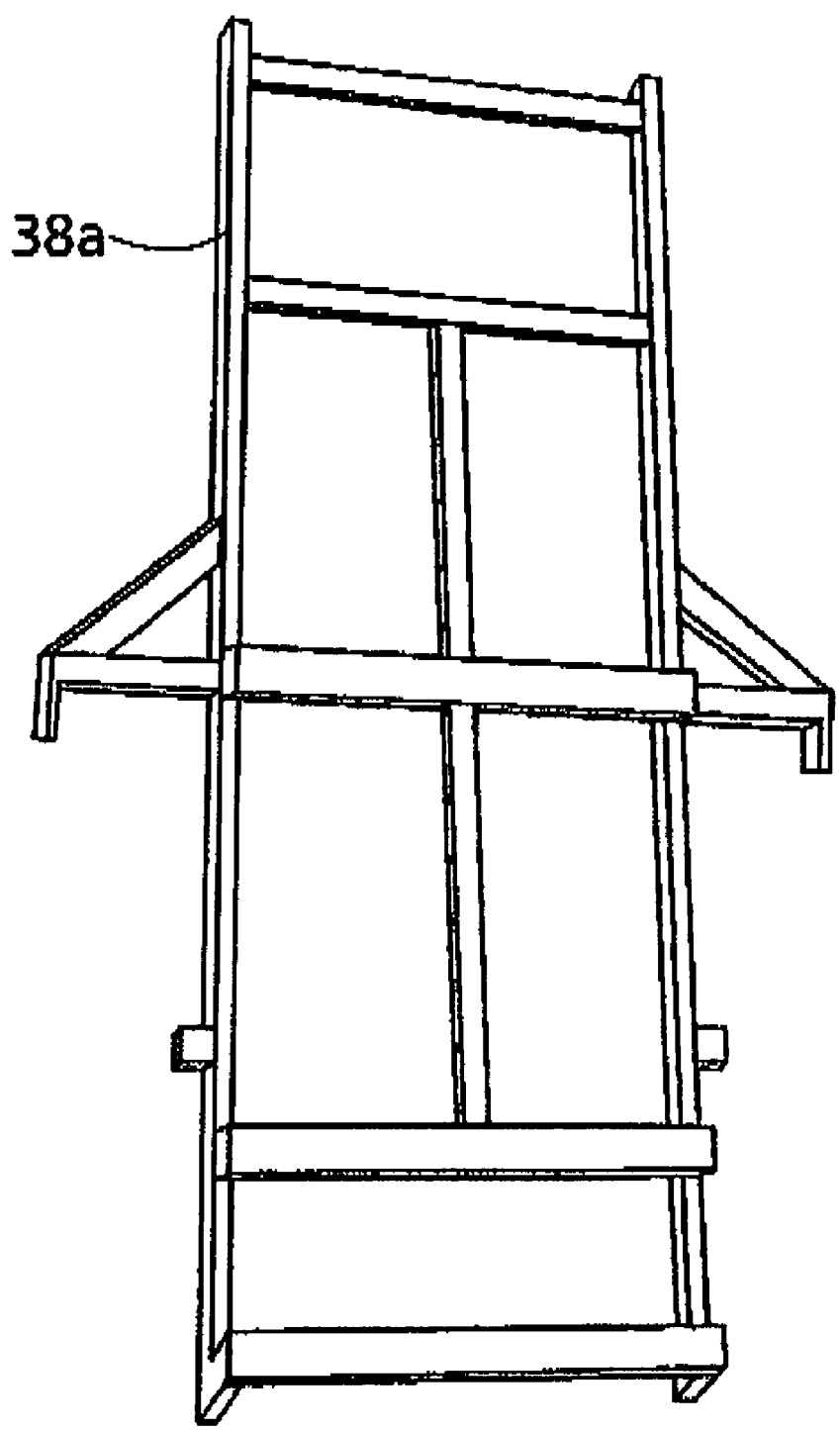
FIG. 25 is a view of an underside of an additional chassis frame prior to mounting of same to an existing chassis of a vehicle for converting the vehicle for wheelchair access.

FIG. 25 shows a separate chassis frame 38a shown prior to mounting of same to an existing chassis of a vehicle for conversion of that vehicle for wheelchair access.

Figure 21:
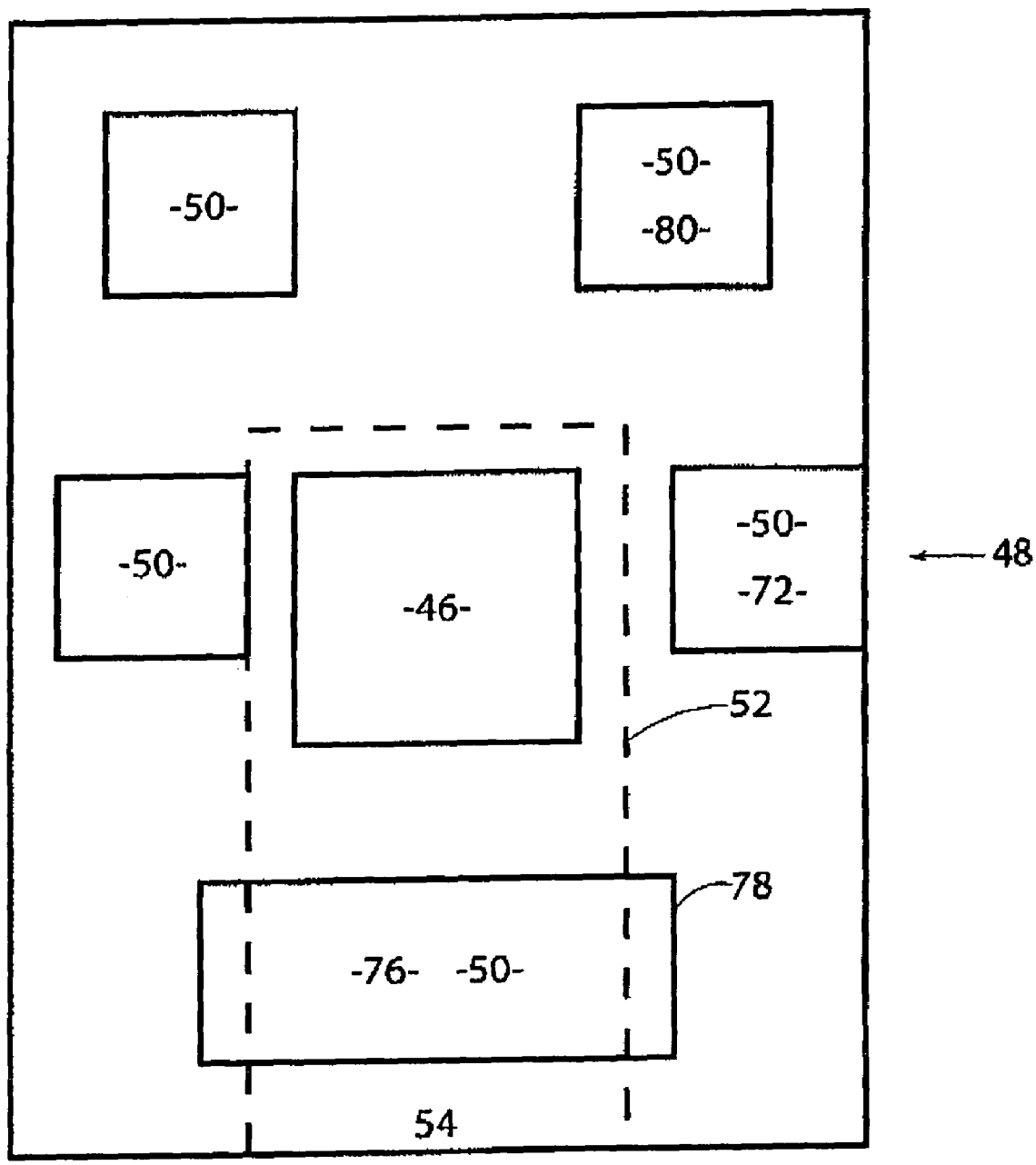
FIG. 21 is a general seating diagram of the vehicles shown in FIGS. 4 to 6 and in FIGS. 12 to 20.
Figure 22:
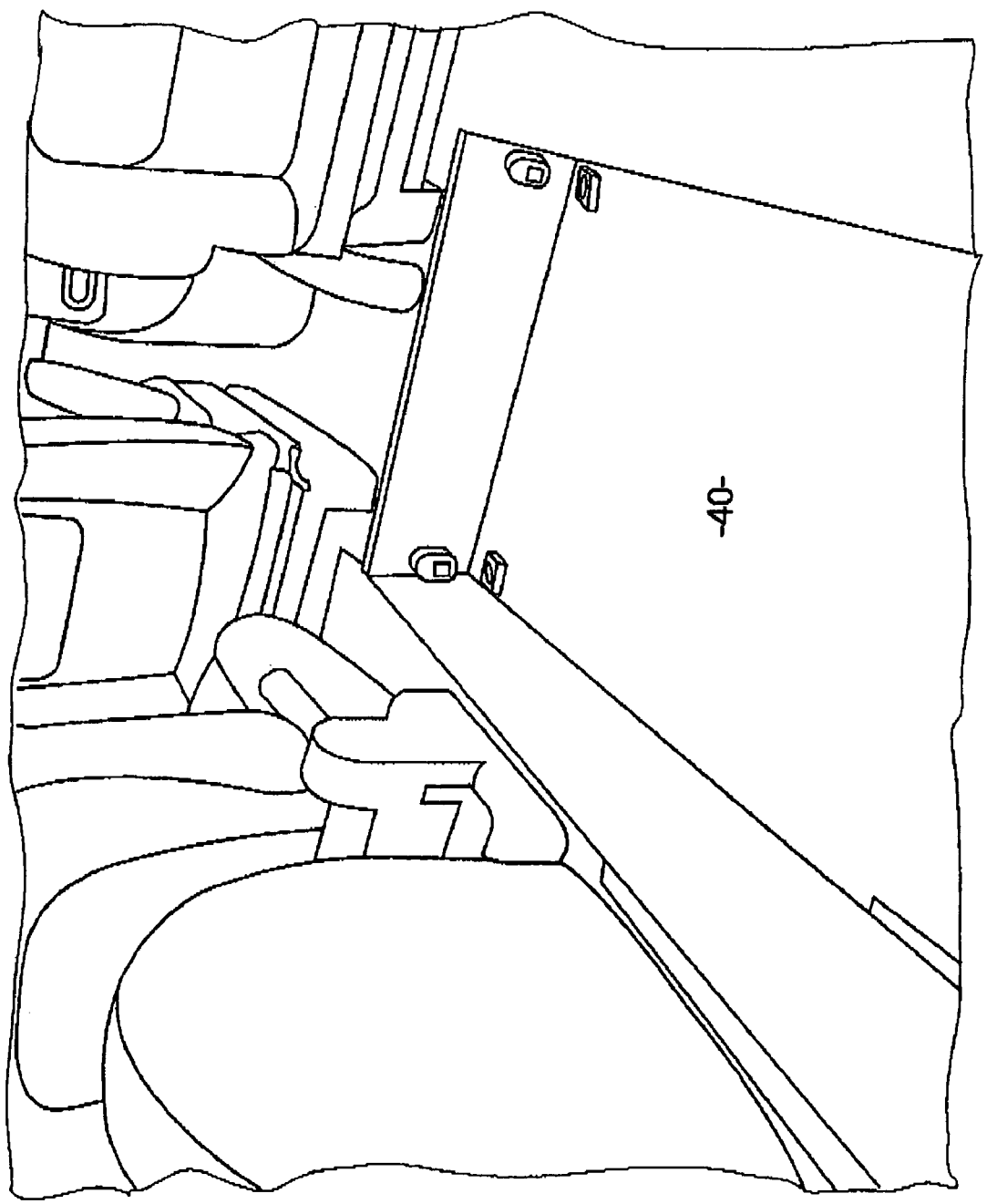
FIG. 22 is a rear perspective view of a front portion of a lowered portion of a floorpan of the vehicle shown in FIGS. 19 and 20.

The vehicle 28 shown in FIGS. 4 to 6 is configured such that a space 46 in which a wheelchair is located during driving of the vehicle 28 is in a centre row 48 of seats 50 of the vehicle, as shown in FIG. 21. In this diagram, the lowered portion of the floorpan is indicated by the broken line 52. The rear of the vehicle is indicated by reference numeral 54.

Figure 12:
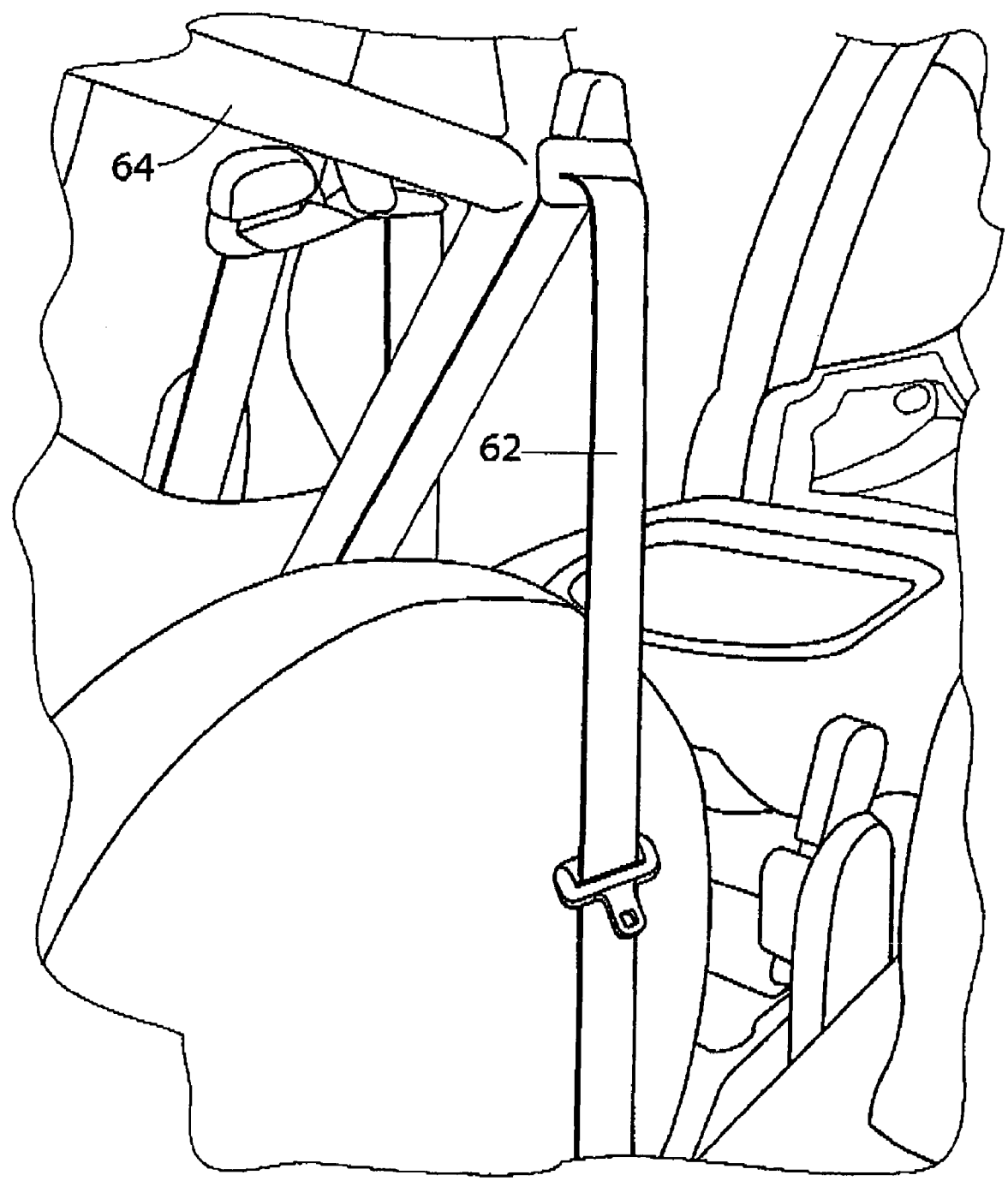
FIG. 12 is a rear perspective view of a restraining belt anchored to a vehicle, for restraining an occupant of a wheelchair during driving of the vehicle.
Figure 13:
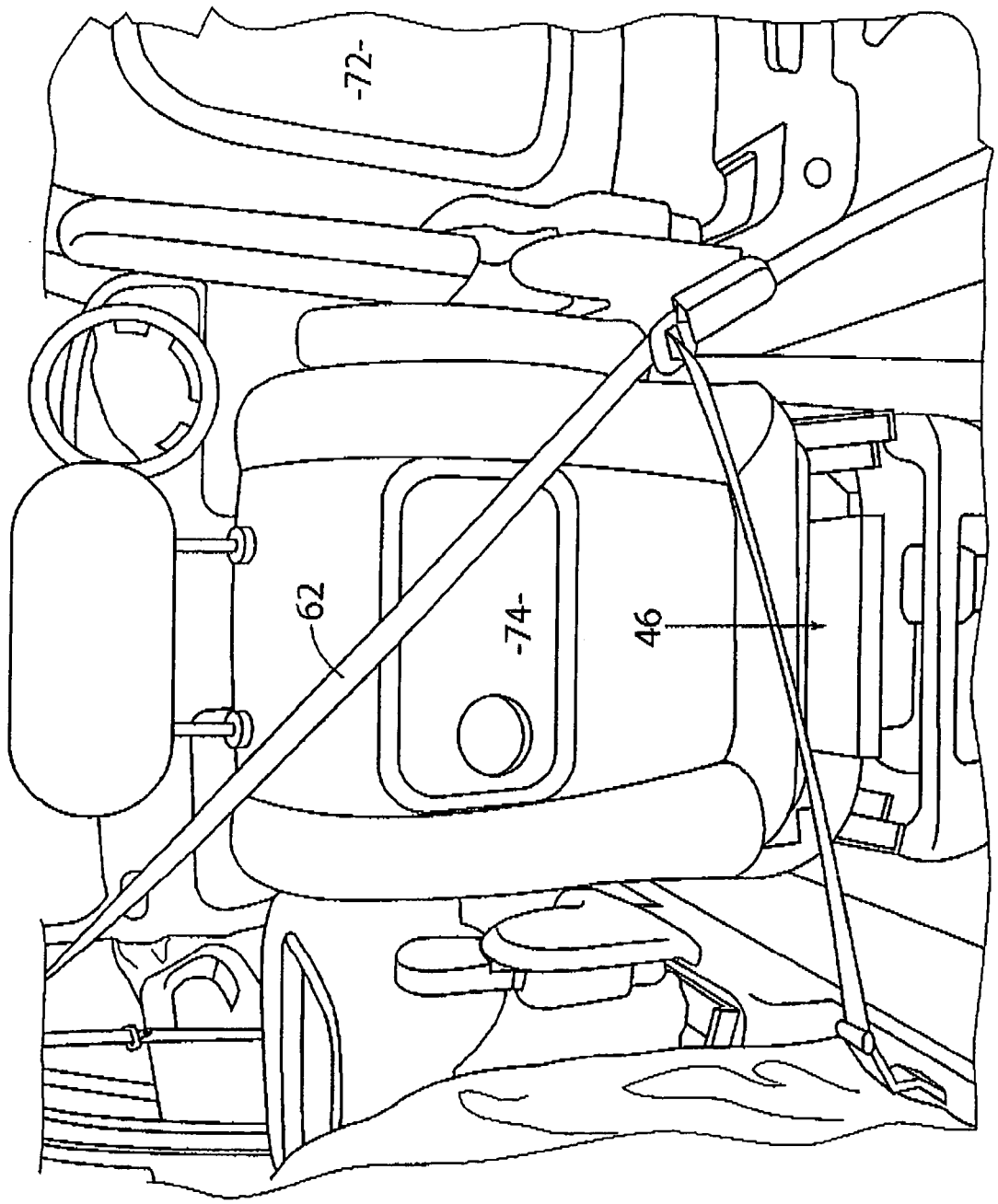
FIG. 13 is a rear perspective view of the restraining belt shown in FIG. 12.

In the embodiment shown in FIGS. 4 to 6 wherein the occupant of the wheelchair remains seated in the wheelchair (the wheelchair being locked into the space 46) during driving of the vehicle, a restraining belt 62 (see FIGS. 12 and 13) is provided in order to provide upper body support to the occupant in case of an accident or abrupt deceleration. The restraining belt 62 is anchored securely to a belt mounting frame 64 fixed to the structure of the vehicle such that the belt 62 is able to provide high restraining forces if the need arises. In the embodiment depicted in FIGS. 12 and 13, the belt mounting frame 64 is made from metal bars fixed to the structure of the vehicle on one side of the space 46 in which the wheelchair is to be located during driving of the vehicle. In use, the belt extends about the front of the upper body of the occupant of the wheelchair and a buckle of the belt is fastened to a buckle receptacle on the opposite side of said space. A safety belt system of this kind is of great benefit, as a conventional belt mounted to the wheelchair is known to fail in accidents, particularly as in previously proposed wheelchair access vehicles the wheelchair itself is prone to breaking free of its lockings to the vehicle when excessive forces are experienced.

Figure 17:
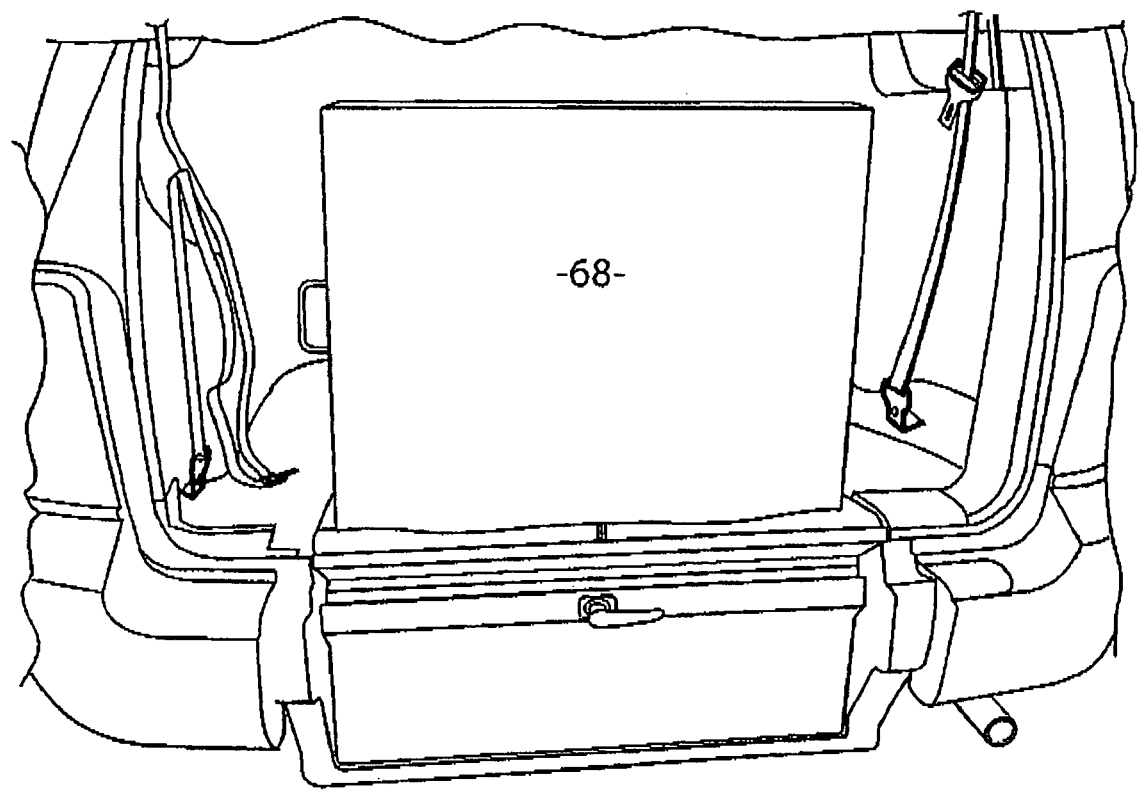
FIG. 17 is a rear view of the vehicle shown in FIGS. 12 to 16, the vehicle being shown with a ramp of the vehicle in a stowed configuration and with a tailgate of the vehicle in an open configuration.
Figure 18:
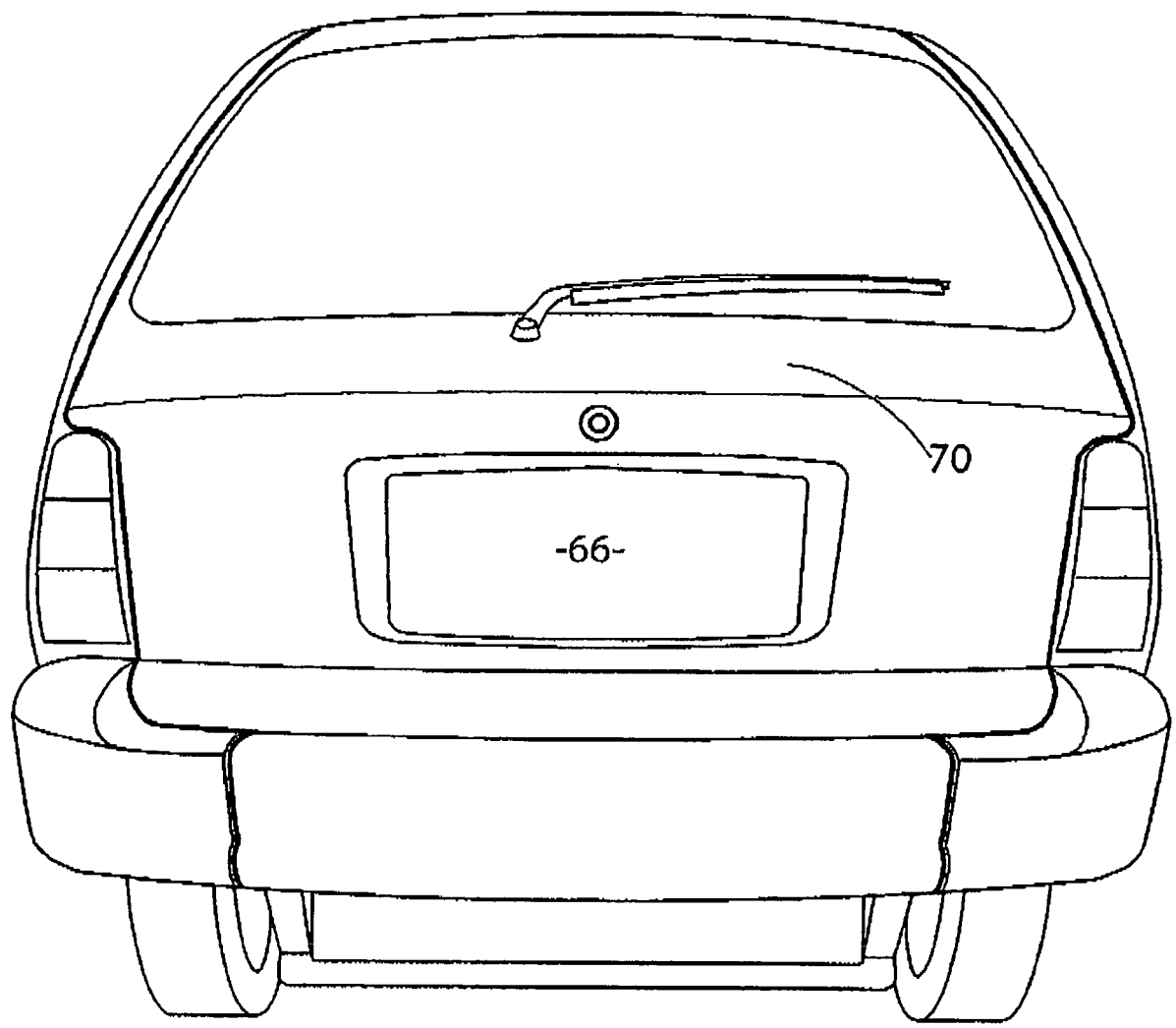
FIG. 18 is a rear view of the vehicle shown in FIGS. 12 to 17, the vehicle being shown with the tailgate in a closed configuration.
Figure 19:
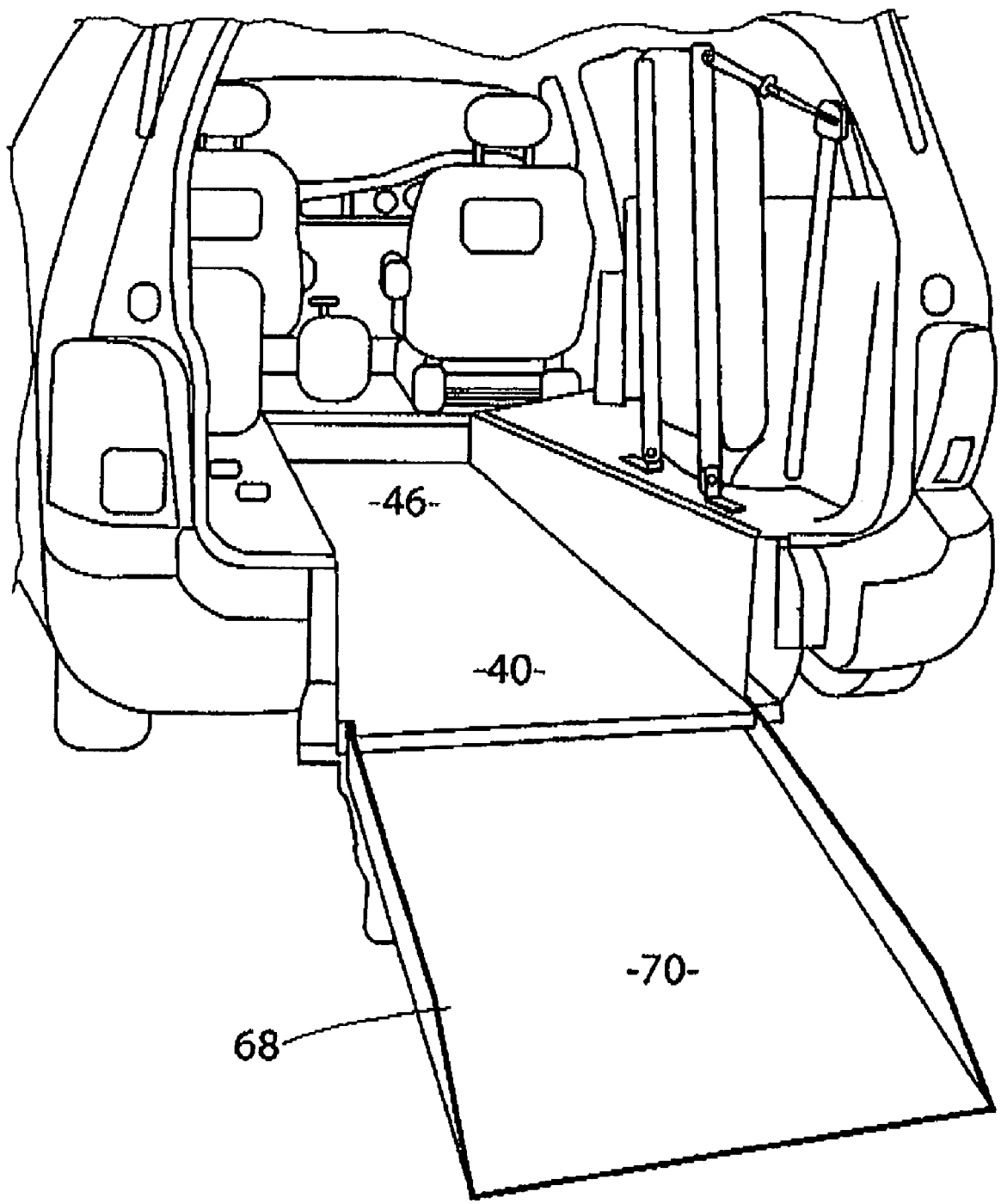
FIG. 19 is a rear view of a vehicle, the vehicle being shown with a ramp of the vehicle in a deployed configuration.
Figure 20:
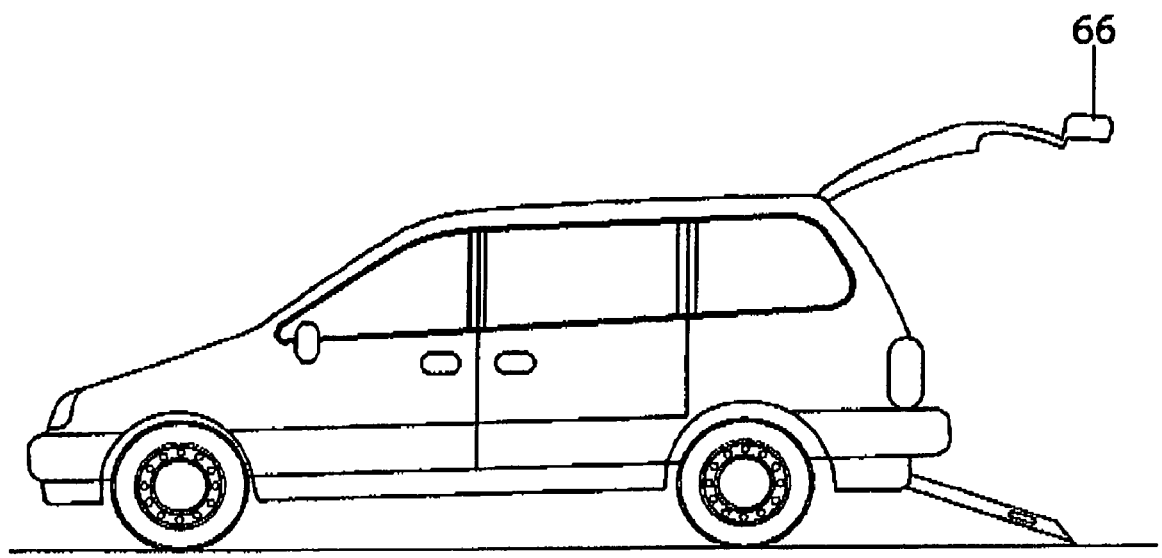
FIG. 20 is a side view of the vehicle shown in FIG. 19, the vehicle being shown with the ramp in the deployed configuration.
Figure 23:
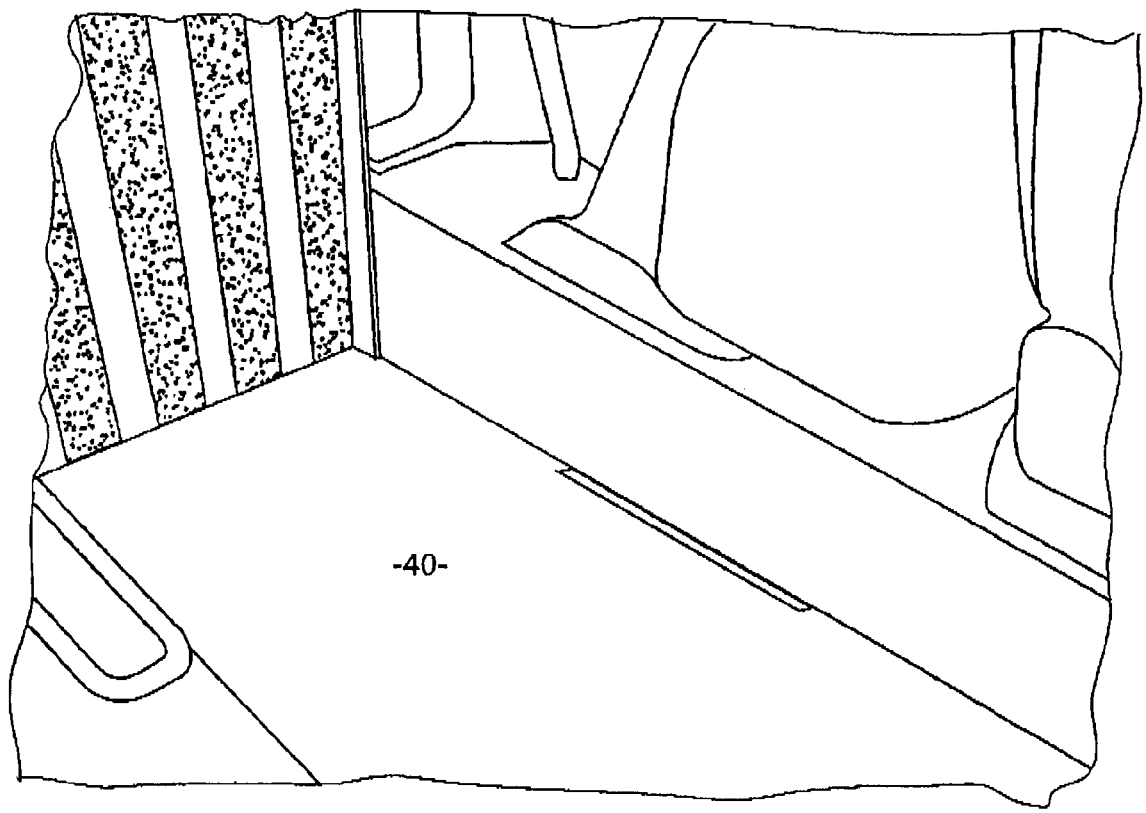
FIG. 23 is a front perspective view of a rear portion of the lowered portion of the floorpan of the vehicle shown in FIG. 22, the ramp of the vehicle being shown in a stowed configuration.

The actual method of entry to the vehicle 28 by a wheelchair and occupant is best seen with reference to FIGS. 17 to 23. With particular regard to FIGS. 19 and 20, a rear tailgate 66 of the vehicle 28 is opened such that a rear folding aluminium ramp 68 is able to be moved from its stowed configuration in which it resides substantially upright at the rear of the vehicle (see FIG. 17) to its deployed configuration in which it extends downwardly from the rear of the vehicle to the ground (see FIGS. 19 and 20). The ramp 68 is provided with a non-slip coating 70 to provide grip such that the wheelchair is able to drive up the ramp 68 (or be pushed up the ramp in the case of a non-motorized wheelchair) and onto the lowered portion of the floorpan 40. Once on the lowered portion of the floorpan 40, the wheelchair is driven or pushed to the space 46 where it is to be located during driving of the vehicle 28. The ramp 68 is then returned to its stowed configuration as shown in FIGS. 17 and 23. In its stowed configuration, the ramp 68 is arranged so as not to interfere with vision from the cabin, and in particular, with the driver's rear vision through a rear window 70 of the tailgate 66 when the tailgate 66 is closed (as seen in FIG. 18). Moreover, the ramp 68 is arranged in its stowed configuration to be as discreet as possible when viewed from outside the vehicle 28 with the tailgate 66 closed, so that the vehicle is able to blend into traffic and does not attract unwanted attention. For example, the external appearance of the vehicle may particularly be of importance where the occupant of the wheelchair is a child being dropped off at school and does not want to draw attention to his or her own self.

Figure 15:
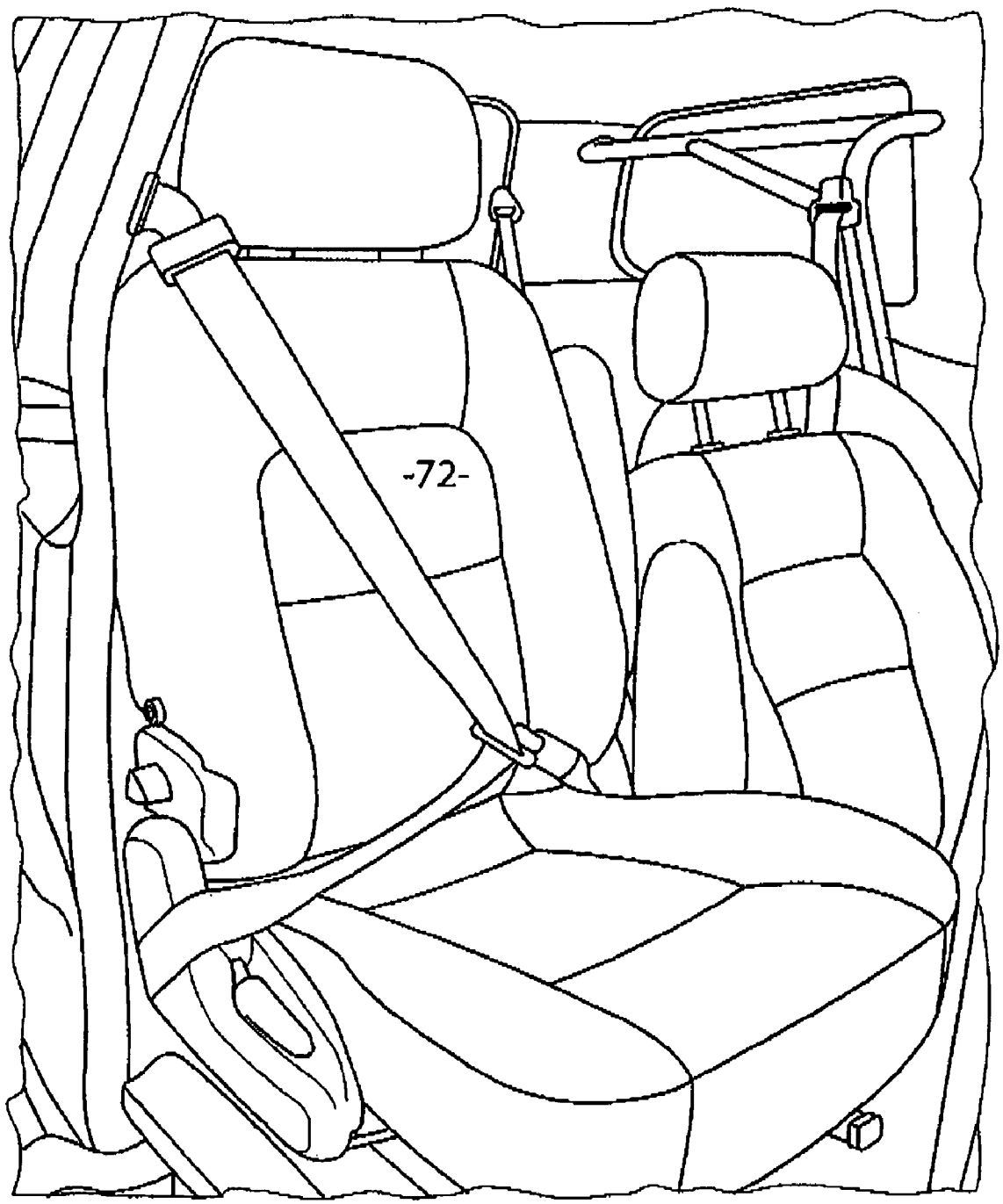
FIG. 15 is a front perspective view of a seat of the vehicle shown in FIGS. 12 to 14, the seat being narrowed to accommodate the wheelchair.

To accommodate the wheelchair in the space 46 in which it is to be located during driving of the vehicle 28, in the embodiment shown in FIG. 15 the neighbouring passenger seat 72 has been narrowed slightly and reupholstered. A neighbouring passenger seat on the opposite side of space 46 may also be narrowed to accommodate the wheelchair. Also, in the embodiment shown in FIG. 13, it is possible to accommodate two wheelchairs in the lowered portion of the floorpan by removing the central seat 74, such that one wheelchair is able to be accommodated in space 46, and by locating a second wheelchair in a space 76 behind space 46. The vehicle is provided with locking restraints for locking each of the wheelchairs in place during driving of the vehicle, and these locking restraints may be in automatic, electric form or manual form. When the vehicle is to be used without a wheelchair in space 46, the central seat 74 is able to be mounted in space 46 for seating a passenger.

Figure 14:
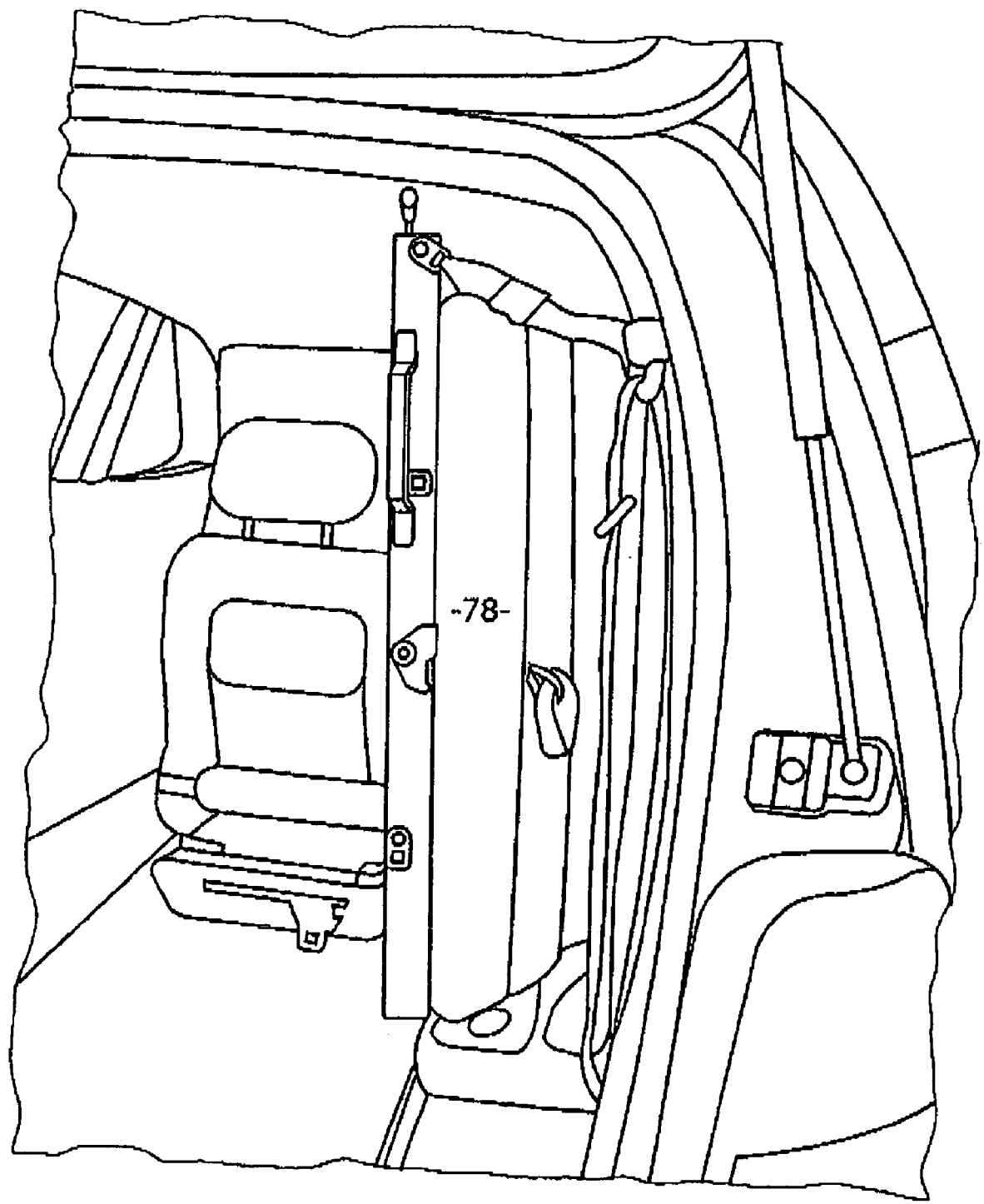
FIG. 14 is a rear perspective view of a rear, right-hand corner of the vehicle shown in FIGS. 12 and 13.

With reference to FIGS. 14 and 21, when a wheelchair is to be moved between the outside of the vehicle and space 46, or when a wheelchair is to be located in space 76 behind space 46, a rear passenger bench seat 78 is able to be folded to its stowed configuration (see FIG. 14) in which it rests substantially upright against a side wall of the vehicle 28.

Figure 24:
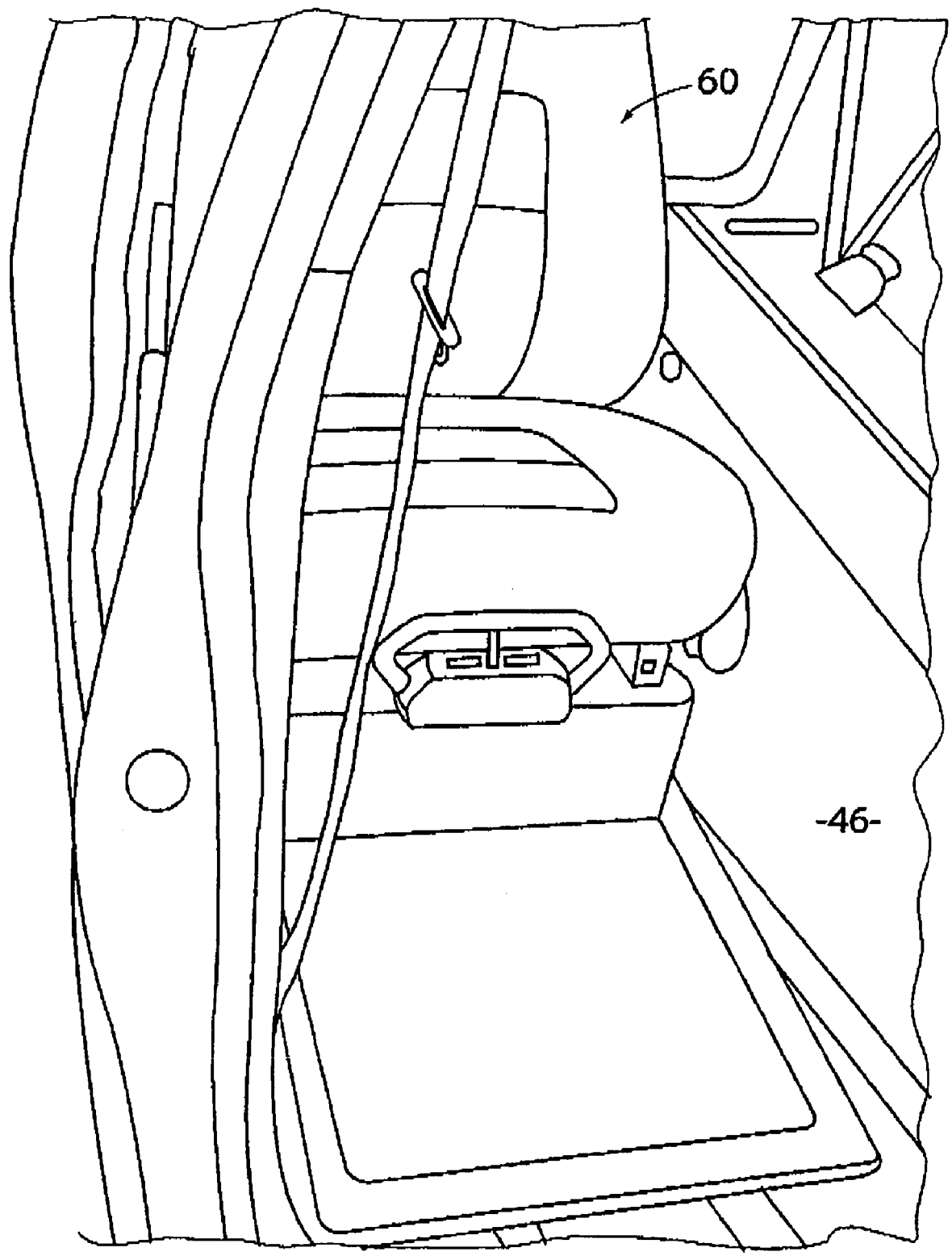
FIG. 24 is a front perspective view of a movable carriage of a vehicle, the movable carriage being in the form of a seat on rails.

Although in the above-discussed conversions the occupant of the wheelchair is a passenger of the vehicle, sitting in the wheelchair during driving of the vehicle, the wheelchair being suitably locked into the space 46 (or 76) by way of electric restraints or the like, an alternative conversion provides a self-drive version of the vehicle in which the wheelchair is locked into the same space 46 during driving of the vehicle. Such a conversion uses a movable carriage in the form of a movable driver's seat 60 on rails (see FIG. 24) which is movable between a rear position (as seen in FIG. 24) in which the driver's seat 60 is adjacent to the space 46 such that the occupant of the wheelchair can transfer from the wheelchair to the driver's seat 60 by simply sliding across laterally, to a front position in which the occupant is able to reach the driving controls of the vehicle from the driver's seat 60. The occupant is able to control the position of the driver's seat 60 between the front and rear positions, for example by way of electric controls or the like. In order to return to the wheelchair from the driver's seat, for example after parking the vehicle, the occupant moves the driver's seat to the rear position and slides across laterally to the wheelchair.

FIGS. 7 to 11 show another form of self-drive vehicle according to an embodiment of the present invention. In the embodiment depicted in these Figures, there is provided a vehicle 28 partially converted to enable access to the vehicle 28 by a wheelchair, and more particularly to enable rear-entry self-drive wheelchair access to the vehicle, wherein the lowered portion 40 of the floorpan extends to a front row driver's position 80 of the vehicle 28 such that an occupant 56 of the wheelchair 58 is able to drive the vehicle 28 from being seated in the wheelchair 58. Although in the embodiment depicted the lowered portion 40 of the floorpan extends forwardly from the rear entrance of the vehicle to include the front row driver's position 80 of the vehicle 28, it is foreseen that in an alternative embodiment, in a vehicle already having a portion of floorpan at the driver's position which is sufficiently low in relation to driving controls and a ceiling of the vehicle prior to conversion, it would not be necessary for that portion of floorpan to be lowered further. Accordingly, in such an embodiment, the lowered portion of the floorpan would only need to extend far enough to enable the wheelchair with occupant to drive from the rear entrance to the driver's position.

In order to accommodate the lowered portion 40 of the floorpan, a fuel tank of the standard vehicle is removed and is replaced by a customised fuel tank located under the floorpan opposite the side of the vehicle to which the lowered portion of the floorpan extends. Similarly, the standard exhaust system from the vehicle post catalytic converter is removed and is replaced with a custom exhaust routed along the same side of the vehicle to which the lowered portion of the floorpan extends. The lowered floorpan is formed by a network of cross-members forming framework to which sheet metal is bonded. The network of cross-members enhances rigidity in the lowered portion of the floorpan to inhibit unwanted flexure during use.

The specific controls provided to enable the occupant to drive the vehicle may differ from case to case, depending on the ability of the occupant to use his or her arms and legs. Such controls are already well-established and will not be described in detail herein. This vehicle uses a similar configuration of the independent rear trailing arm suspension components 10 as is used in the vehicle shown in FIGS. 4 to 6, however instead of the lowered portion 40 of the floorpan extending from the rear 54 of the vehicle to just behind the front row of seats as shown in FIG. 21, the lowered portion 40 of the floorpan of the embodiment shown in FIGS. 7 to 11 extends from the rear 54 of the vehicle to the driver's position 80. Similarly to the previously-described embodiment, the wheelchair 58 is locked into the driver's position 80 by an electric restraint or the like to secure the wheelchair during driving of the vehicle.

Figure 10:
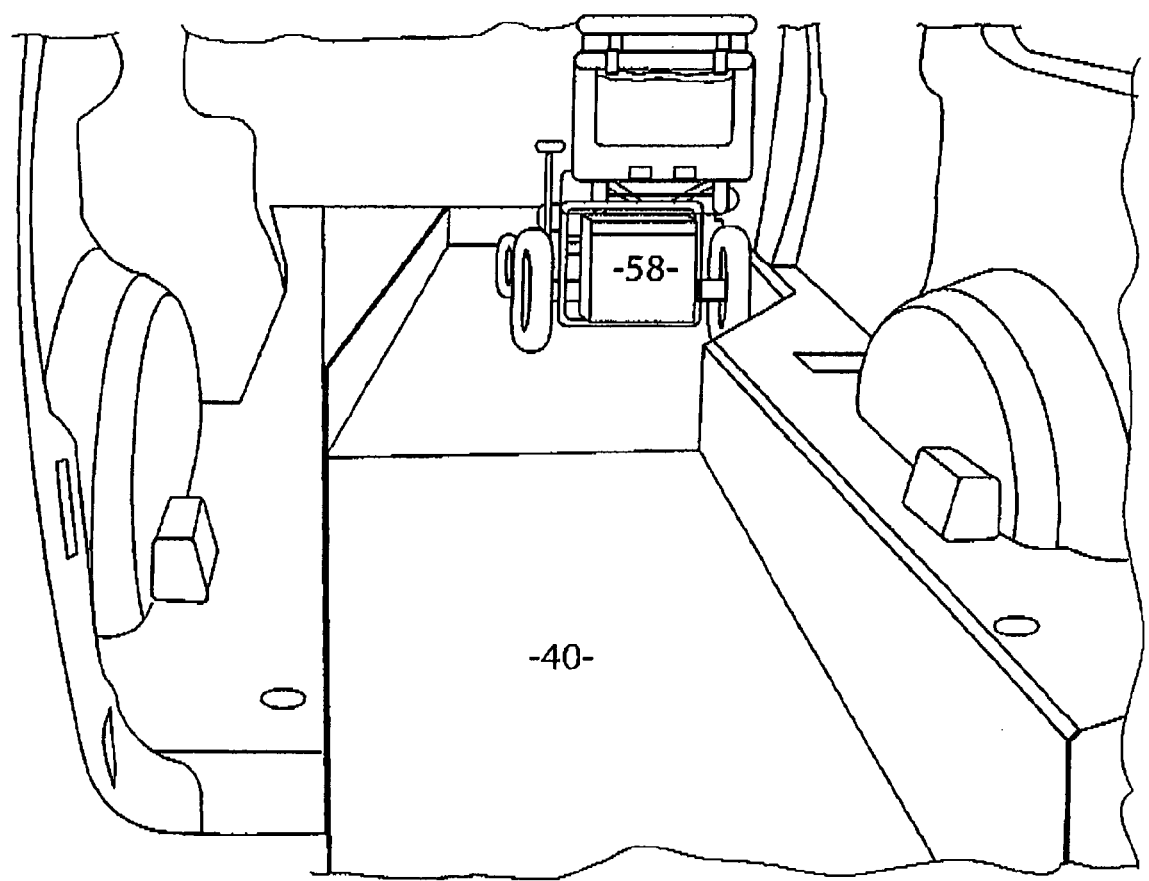
FIG. 10 is a rear perspective view of the lowered floorpan shown in FIGS. 7, 8 and 9.
Figure 10A:
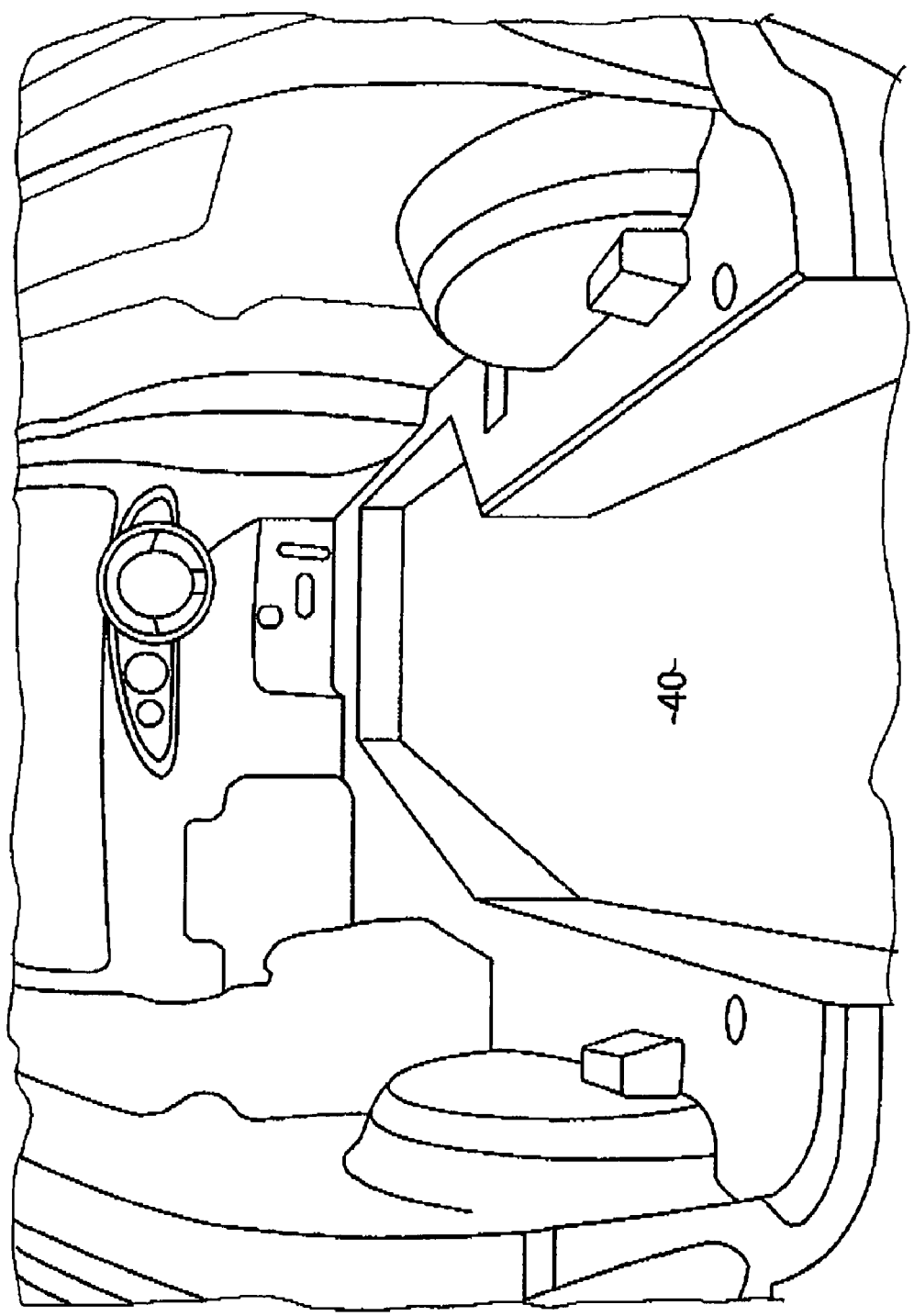
FIG. 10a is a rear perspective view of the lowered floorpan shown in FIGS. 7 to 10.
Figure 10B:
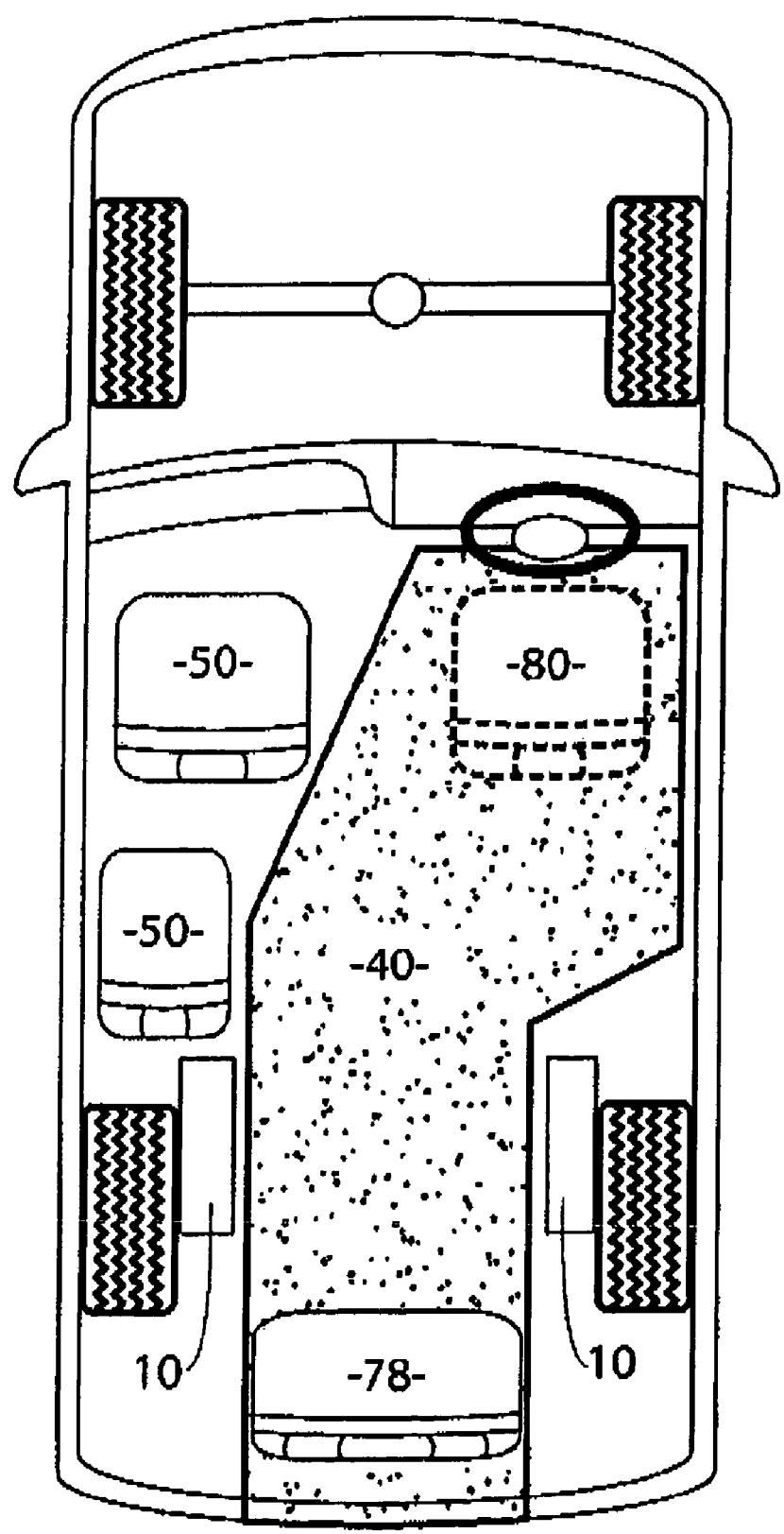
Figure 11:
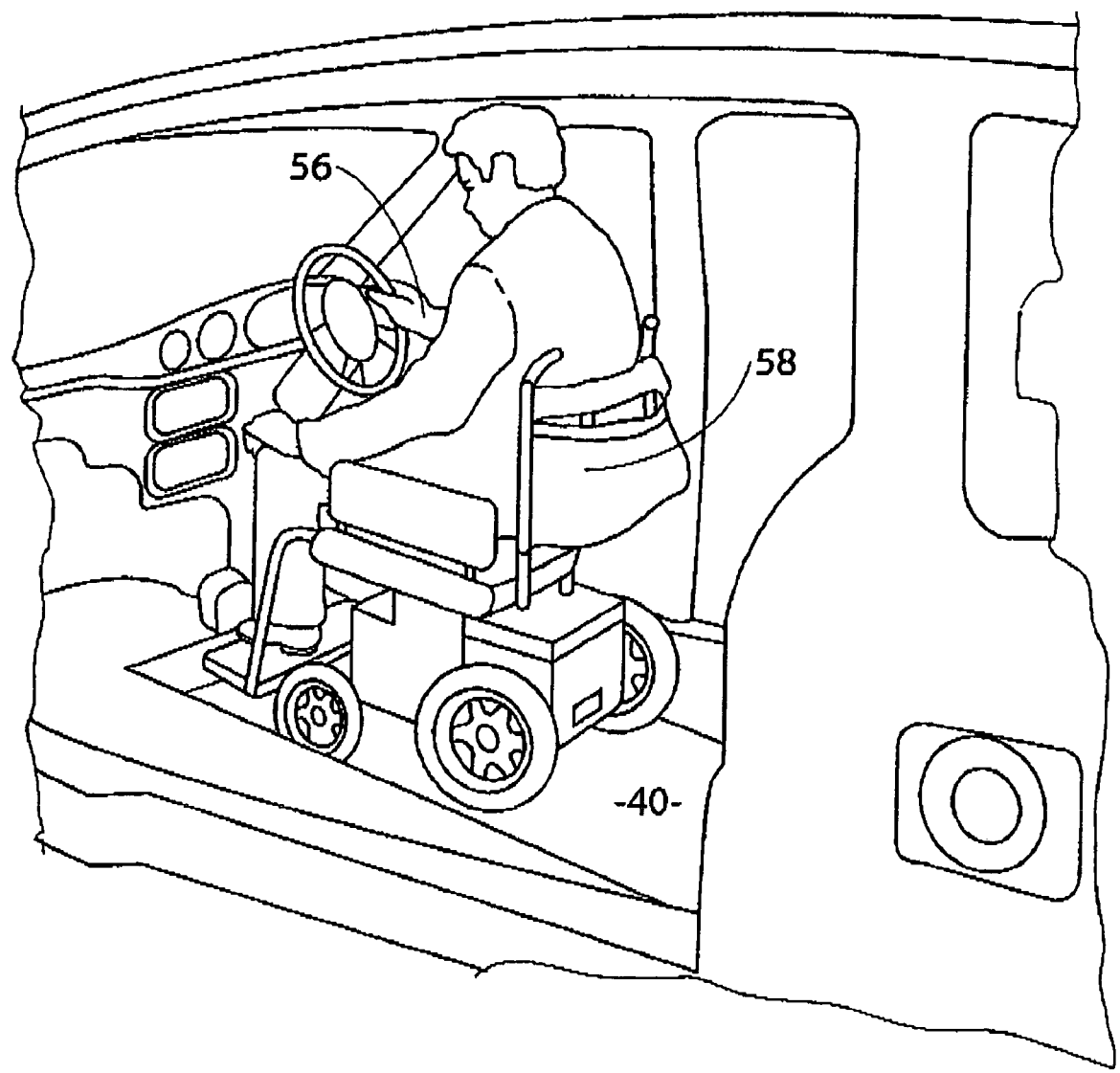
FIG. 11 is a left side perspective view of a wheelchair with occupant in the vehicle shown in FIGS. 7 to 10a, the wheelchair being located at the driver's position of the vehicle such that the occupant is able to drive the vehicle from the wheelchair.

As shown in the seating diagram in FIG. 10b, in a proposed drive-from-wheelchair embodiment of the present invention, a front row passenger seat 50, centre row passenger seat 50, and two-person rear passenger bench seat 78 are also provided, with the bench seat 78 being a two-person seat which is stowable in a position in which it rests substantially upright against a side wall of the vehicle. The centre row passenger seat 50 is narrowed to fit in the space available adjacent the lowered portion of the floorpan, and is mounted on a releasable mounting to enable removal of the seat from the vehicle when it is not required. Preferably, the releasable mounting is retained from the standard vehicle as it existed prior to conversion.

In an alternative conversion (not shown), a vehicle is converted to have rear-entry wheelchair access wherein the lowered portion of the floorpan extends to the front of the cabin to include a front row passenger position of the vehicle in which position the wheelchair is to be located during driving of the vehicle such that the wheelchair occupant is able to ride in the wheelchair and next to the driver of the vehicle.

One or more of the vehicle conversions described above provide advantages over previously proposed wheelchair accessible vehicles. In particular, the lowered and substantially flat floor enables wheelchair occupants in the vehicle to have improved headroom, improved mobility as the widened lowered floorpan portion enables front trolley wheels of a wheelchair to rotate freely when changing direction, and improved visibility as the wheelchair occupant's head height is brought closer to the standard head height for which the vehicle is designed.

One particular model of vehicle suitable for conversion in accordance with the present invention, by way of example only, is the Kia Sedona, also known as the Kia Carnival in some markets.

The above embodiments have been described by way of example only and modifications are possible within the scope of the invention. In particular, although in the embodiments described the original suspension removed from the vehicle to be replaced by the independent rear trailing arm components is of the type having a rear beam axle configuration, it is also foreseen that other suspension systems which do not enable sufficient wheelchair access to a vehicle may be successfully converted in accordance with the present invention.

Although the vehicle depicted in the drawings is a right-hand drive vehicle, the invention is of course also applicable to left-hand drive vehicles, in which case the general layout of the lowered portion of the floorpan is mirrored from right to left to suit.

What is claimed is:

1. A method for converting a vehicle to allow wheelchair accessibility to the vehicle, the method comprising:
    modifying a chassis structure comprising an original chassis structure with an additional chassis structure mounted to the original chassis structure;
    removing an original rear beam axle suspension from the vehicle;
    installing a substituted rear suspension in place of the original rear beam axle suspension, the substitute rear suspension comprising an independent rear trailing arm suspension having independent rear trailing arm suspension components mounted to opposite sides of the chassis structure; and,
    installing a floorpan to the chassis structure, the floorpan having a lowered portion supported directly by the additional chassis structure, the lowered portion being located directly between the independent rear trailing arm suspension components and extending forwardly from a rear entrance of the vehicle.

2. The method of claim 1, wherein the lowered portion of the floorpan extends forwardly from a rear entrance of the vehicle such that a wheelchair is able to be driven from the rear entrance to a driver's position to enable the occupant of the wheelchair to drive the vehicle from the wheelchair.

3. The method of claim 1, wherein the vehicle has wheelchair accessibility to the rear of the vehicle through a doorway at the rear of the vehicle.

4. The method of claim 1, wherein the lowered portion of the floorpan is at least 760 mm wide between rear wheels of the vehicle.

5. The method of claim 4, wherein the lowered portion of the floorpan is at least 840 mm wide between rear wheels of the vehicle.

6. The method of claim 5, wherein the lowered portion of the floorpan is 850 mm wide between rear wheels of the vehicle.

7. The method of claim 1, wherein the lowered portion of the floorpan is substantially flat.

8. The method of claim 1, wherein the vehicle is provided with a restraining belt, the restraining belt being anchored to the vehicle at either side of a space in which a wheelchair is to be located during driving of the vehicle, for restraining the occupant of the wheelchair.

9. The method of claim 8, wherein the belt is anchored to the vehicle on one side of the space in which the wheelchair is to be located during driving of the vehicle, by way of a belt mounting frame fixed to the structure of the vehicle.

10. The method of claim 1, wherein the vehicle is provided with locking restraints for locking a wheelchair in place during driving of the vehicle.

11. The method of claim 1, wherein the substitute rear suspension includes:
    an independent rear trailing arm suspension component comprising an elongated arm having a pivotal coupling at a front end thereof for enabling the elongated arm to pivot with respect to the chassis structure of the vehicle about an axis substantially transverse to a longitudinal axis of the elongated arm;
    a wheel mounting for mounting a wheel of the vehicle longitudinally spaced from an axis of rotation of the elongated arm;
    a spring mounting for mounting a spring between the elongated arm and the chassis structure of the vehicle; and
    a shock absorber mounting for mounting a shock absorber between the elongated arm and the chassis structure of the vehicle.

12. The method of claim 11, wherein the pivotal coupling comprises a bearing arrangement at the front end of the elongated arm.

13. The method of claim 11, wherein the shock absorber mounting comprises a shock absorber mounting bracket at a rear end of the elongated arm.

14. The method of claim 11, wherein the spring comprises one of a coil spring and an air spring, and wherein the spring mounting comprises a seating in an upper surface of the elongated arm for receiving a lower end of the one of the coil spring and the air spring.

15. The method of claim 11, wherein the wheel mounting comprises a wheel mounting bracket mounted to an outer side of the elongated arm.

16. A method for converting a motor vehicle for wheelchair access, the method comprising:
    modifying an original chassis structure of the vehicle by mounting a second chassis structure to the original chassis structure;
    removing an original rear beam axle suspension from the vehicle;
    mounting an independent rear trailing arm suspension at opposite sides of the modified chassis structure; and,
    mounting a floorpan to the modified chassis structure, the floorpan having a lowered portion supported directly by the second chassis structure, the lowered portion being located between components of the independent rear trailing arm suspension and extending forwardly from a rear entrance to the vehicle.

* * * * *

UNITED STATES PATENT AND TRADEMARK OFFICE
CERTIFICATE OF CORRECTION

| | | |
|---|---|---|
| PATENT NO. | : 7,641,209 B2 | Page 1 of 1 |
| APPLICATION NO. | : 10/822443 | |
| DATED | : January 5, 2010 | |
| INVENTOR(S) | : Jeffrey Duncan Watters | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Sixteenth Day of November, 2010

David J. Kappos
*Director of the United States Patent and Trademark Office*